United States Patent
Zhao et al.

(10) Patent No.: US 10,776,164 B2
(45) Date of Patent: Sep. 15, 2020

(54) DYNAMIC COMPOSITION OF DATA PIPELINE IN ACCELERATOR-AS-A-SERVICE COMPUTING ENVIRONMENT

(71) Applicant: EMC IP Holding Company LLC, Hopkinton, MA (US)

(72) Inventors: Junping Zhao, Beijing (CN); Kun Wang, Beijing (CN); John S. Harwood, Paxton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 16/206,857

(22) Filed: Nov. 30, 2018

(65) Prior Publication Data

US 2020/0174840 A1    Jun. 4, 2020

(51) Int. Cl.
G06F 9/46      (2006.01)
G06F 9/50      (2006.01)
G06F 9/54      (2006.01)
G06N 20/00     (2019.01)

(52) U.S. Cl.
CPC ............ *G06F 9/5011* (2013.01); *G06F 9/547* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,888,831 B1 | 5/2005 | Hospodor et al. | |
| 8,938,416 B1 | 1/2015 | Cole et al. | |
| 9,384,583 B2 | 7/2016 | Diard | |
| 9,703,573 B1 | 7/2017 | Giefers et al. | |
| 9,836,354 B1 | 12/2017 | Potlapally et al. | |
| 9,984,648 B2 | 5/2018 | Chakraborty et al. | |

(Continued)

OTHER PUBLICATIONS

Minsoo Rhu et al., "vDNN: Virtualized Deep Neural Networks for Scalable, Memory-Efficient Neural Network Design," 49th IEEE/ACM International Symposium on Microarchitecture (Micro-49), 2016, 13 pages.

(Continued)

*Primary Examiner* — Gregory A Kessler
(74) *Attorney, Agent, or Firm* — Ryan, Mason & Lewis, LLP

(57) ABSTRACT

Techniques are provided to decouple data pipeline tasks from an execution flow of a high-performance computing task (e.g., distributed deep model training) in a distributed computing system. For example, a method includes receiving a client request to provision resources for executing a computing job, provisioning accelerator resources of one or more accelerator server nodes in the distributed computing system to perform tasks associated with an execution flow of the computing job, and provisioning a logical nodes within the distributed computing system to compose a data flow pipeline which is configured to perform data flow operations associated with the computing job for providing data to the provisioned accelerator resources to perform the tasks associated with the execution flow of the computing job. The data flow operations include, e.g., data storage input/output operations, data pre-processing operations, and data staging operations, which are decoupled from the execution flow of the computing job.

20 Claims, 8 Drawing Sheets

(56) References Cited

U.S. PATENT DOCUMENTS

| | | |
|---|---|---|
| 10,109,030 B1 | 10/2018 | Sun et al. |
| 2008/0195843 A1 | 8/2008 | Muniandy |
| 2009/0089560 A1 | 4/2009 | Liu et al. |
| 2011/0131430 A1 | 6/2011 | Krishnamurthy et al. |
| 2012/0011401 A1 | 1/2012 | Ranganathan et al. |
| 2014/0198112 A1 | 7/2014 | Miyamoto et al. |
| 2014/0325073 A1 | 10/2014 | Urbach |
| 2015/0213163 A1 | 7/2015 | Yang et al. |
| 2015/0271331 A1 | 9/2015 | Segre et al. |
| 2015/0317192 A1 | 11/2015 | Munshi et al. |
| 2016/0247248 A1 | 8/2016 | Ha et al. |
| 2017/0132744 A1 | 5/2017 | Wilt et al. |
| 2017/0220949 A1 | 8/2017 | Feng et al. |
| 2017/0293758 A1 | 10/2017 | Saxena et al. |
| 2017/0353397 A1 | 12/2017 | Che |
| 2018/0075347 A1 | 3/2018 | Alistarh et al. |

OTHER PUBLICATIONS

Tensorflow, "Tensor/Tensorflow," https://github.com/tensorflow/tensorflow/blob/master/tensorflow/python/training/saver.py, 2015, 32 pages.

S. Han et al., "Deep Compression: Compressing Deep Neural Networks with Pruning, Trained Quantization and Huffman Coding," arXiv:1510.00149v5, Published as a conference paper at International Conference on Learning Representations (ICLR), Feb. 16, 2016, 14 pages.

Tony Paikeday, "Seven Service Providers Delivering the GPU-Accelerated Cloud—Built on NVIDIA GRID," https://blogs.nvidia.com/blog/2016/09/27/the-gpu-accelerated-cloud/, Sep. 27, 2016, 4 pages.

amazon.com, "Linux Accelerated Computing Instances," http://docs.aws.amazon.com/AWSEC2/latest/UserGuide/using_cluster_computing.html, 2018, 9 pages.

Tiffany Trader, "Microsoft Puts GPU Boosters on Azure Cloud," https://www.hpcwire.com/2016/09/29/microsoft-puts-gpu-boosters-on-azure-cloud/, Sep. 29, 2015, 3 pages.

U.S. Appl. No. 15/487,887, filed Apr. 14, 2017, entitled "Managing Access to a Resource Pool of Graphics Processing Units Under Fine Grain Control."

U.S. Appl. No. 15/498,055 filed in the name of Junping Zhao et al. filed Apr. 26, 2017 and entitled "Intelligent Data Coordination for Accelerated Computing in Cloud Environment."

U.S. Appl. No. 15/496,568 filed in the name of Junping Zhao et al. filed Apr. 25, 2017 and entitled "Checkpointing for GPU-as-a-Service in Cloud Computing Environment."

L. Luo et al., "Parameter Hub: High Performance Parameter Servers for Efficient Distributed Deep Neural Network Training," arXiv:1801.09805v1 [Distributed, Parallel, and Cluster Computing [cs.DC], Jan. 30, 2018, 3 pages.

Dell Inc., "REALIZE: Using GPUaaS in Cloud Foundry," https://delltechnologiesworldonline.com/2017/connect/.../octo.01%20final.pdf, 2017, 27 pages.

200

300

500

DYNAMIC COMPOSITION OF DATA PIPELINE IN ACCELERATOR-AS-A-SERVICE COMPUTING ENVIRONMENT

FIELD

This disclosure relates generally to techniques for accelerated data processing in a distributed computing environment.

BACKGROUND

Currently, various entities provide cloud computing services globally to different customers over various sectors for critical and non-critical applications. These entities provide cloud computing services including, for example, Software-as-a-Service (SaaS), Infrastructure-as-a-Service (IaaS), and/or Platform-as-a-Service (PaaS). A cloud computing system typically comprises a large cluster of servers distributed over one or more data centers for purposes of providing data protection, high availability, and high-performance computing, and to otherwise provide sufficient quality of service (QoS) for successful service delivery and meet the obligations of service level agreements (SLAs) with the cloud customers.

Various cloud-based services such as accelerator ("X")-as-a-Service (XaaS) and graphics processing unit (GPU)-as-a-Service (GPUaaS) allow cloud users and applications to utilize specialized hardware accelerator resources that exist in different servers within one or more data centers. XaaS allows for pooling, sharing, and optimization of a heterogenous computing environment comprising specialized and expensive hardware accelerators including, but not limited to, GPUs, tensor processing units (TPUs), application-specific integrated circuits (ASICs), field programmable gate array (FPGAs), image processing units (IPUs), emerging deep learning accelerators (DLAs), advanced graph processors, artificial intelligence (AI) accelerators, and other specialized hardware accelerator resources that are configured to support high-performance computing (HPC) services provided by cloud computing systems.

The implementation of XaaS or GPUaaS in a distributed computing environment, which comprises a large scale of shared accelerator resources (hardware, virtual, etc.) executing on a cluster of computing nodes, can support various emerging HPC applications such as big data analytics, inference and model training for machine learning and deep learning applications, AI processing, big data analytics, etc. However, implementing an efficient distributed computing environment for these types of HPC applications is not trivial since the intensive computational workloads, and the massive volume of data which must be stored, streamed, prefetched, and coordinated between the shared computing resources of the distributed computing platform, presents a significant challenge and practical limit on system performance and scalability.

SUMMARY

Illustrative embodiments of the invention include methods for decoupling data pipeline tasks from an execution flow of a high-performance computing task in a distributed computing system. For example, in one embodiment, a method comprises: receiving a client request from a client node to provision resources for executing a computing job in a distributed computing system; provisioning a plurality of accelerator resources of one of more accelerator server nodes in the distributed computing system to perform tasks associated with an execution flow of the computing job; and provisioning a plurality of logical nodes within the distributed computing system to compose a data flow pipeline which is configured to perform data flow operations associated with the computing job for providing data to the provisioned accelerator resources to perform the tasks associated with the execution flow of the computing job; wherein the data flow operations of the computing job comprise data storage input/output operations, data pre-processing operations, and data staging operations, which are decoupled from the execution flow of the computing job.

In one exemplary embodiment, the computing job comprises a distributed deep learning model training job, wherein the execution flow comprises application programming interface calls that are directed to the accelerator server nodes from the client node to perform deep learning model training tasks using data provided by the data flow pipeline.

Other embodiments of the invention include, without limitation, systems and articles of manufacture comprising processor-readable storage media, which are configured to decouple data pipeline tasks from the execution flow of a high-performance computing task in a distributed computing system.

DETAILED DESCRIPTION

Figure 1:
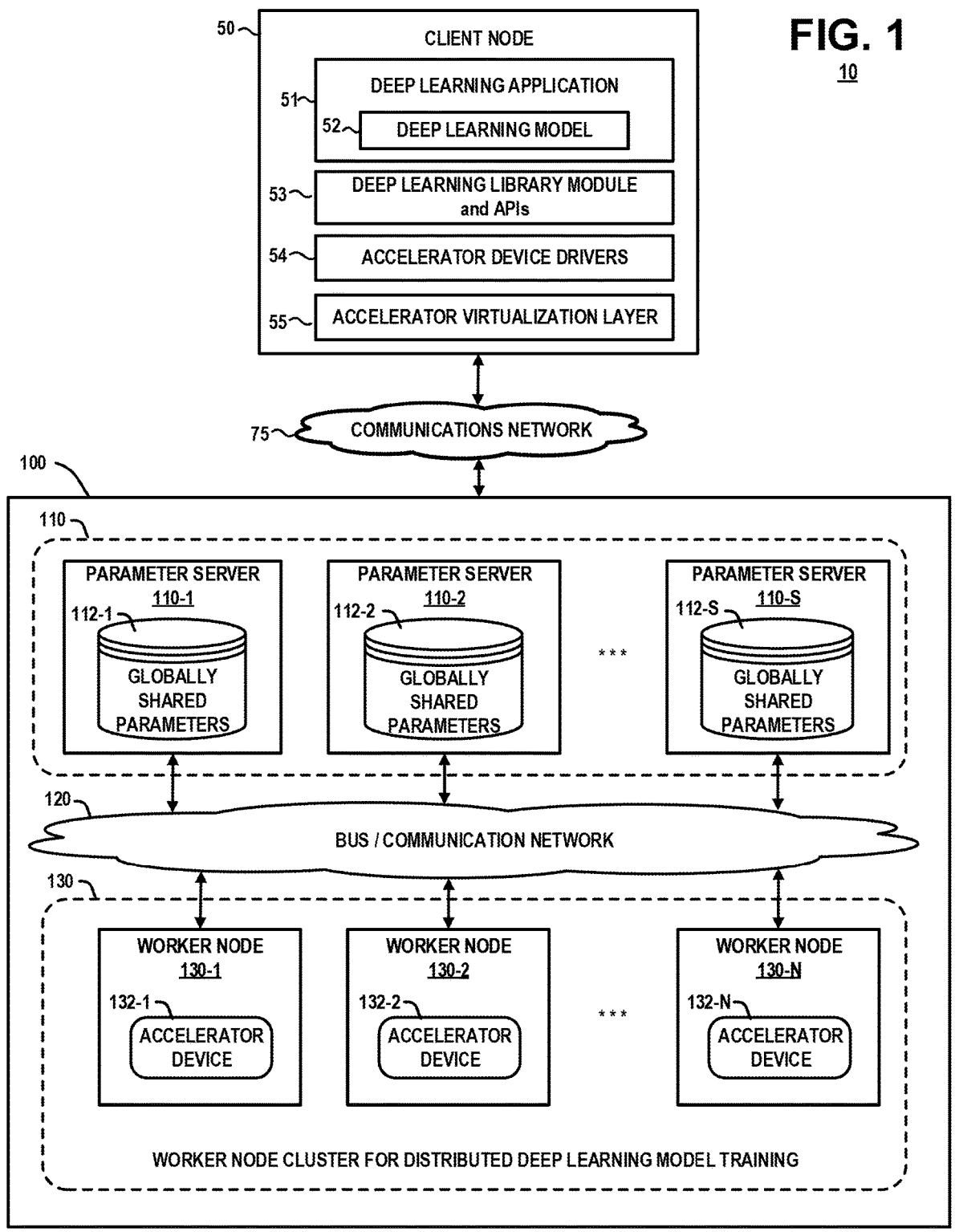
FIG. 1 schematically illustrates a computing system to perform a distributed deep learning model training job using a distributed parameter server system to synchronize and exchange model parameters between a cluster of worker nodes, wherein the computing system can be configured to decouple data pipeline tasks from the execution flow of the distributed deep learning training task using data flow pipeline composition techniques according to embodiments of the invention.

Illustrative embodiments of the invention will now be explained in further detail with regard to systems and methods for decoupling data pipeline tasks from the execution flow of a high-performance computing task (e.g., distributed deep learning training). The data pipeline is mapped to a plurality of logical nodes which are dynamically composed into a data pipeline to perform various data pipeline operations such as data input/output, data pre-processing, staging, etc. This allows the data pipeline operations to be performed concurrently with the execution flow in a resource efficient and scalable manner. While the exemplary embodiments discussed herein can be implemented for various HPC applications, for illustrative purposes, embodiments of the invention will be discussed in the context of performing distributed deep learning model training for deep neural network (DNN) applications in a distributed computing environment. A distributed deep learning model training process requires a significant use of computing resources (e.g., processor, memory, storage, and networking resources), and the communication of large amounts of data over internal system busses and/or inter-node network communication links.

A deep learning model is typically utilized in machine learning applications for pattern recognition, image processing, and other artificial intelligence applications. A deep learning application can utilize a DNN, wherein a DNN comprises a feedforward artificial neural network with multiple hidden layers. A convolutional neural network (CNN) is one class of DNN which is commonly applied for analyzing images. A CNN comprises a sequence of functional layers including an input layer, an output layer, and a plurality of hidden layers between the input and output layers. The functional layers include, but are not limited to, convolutional layers, pooling layers, fully connected layers, normalization layers, etc. A convolutional layer applies a "convolution operation" to an input dataset and passes the processing results to the next layer in the network. As is known in the art, a convolutional layer applies filters (alternatively referred to as neurons or kernels) across all regions of an input dataset, wherein each filter is spatially smaller than the full volume of the input data set. The filters of a convolutional layer each comprise a set of learnable parameters (or weights), which are learned using a deep learning model training process. A convolutional layer utilizes a set of filters to perform a forward pass through an input dataset, wherein each filter slides (or convolves) across the width and height of the input volume and computes dot products between the entries of the filter and the input data at any position (i.e., receptive field). In essence, the convolution layer computes an output of neurons which are connected to corresponding local regions in the input data.

A deep learning model can be trained using a stochastic gradient descent (SGD) training process. With SGD training, error gradient with respect to model parameters of a given deep learning model are calculated using multiple iterations of a backpropagation process. A backpropagation comprises a sequence of three cycles including (i) a forward process, (ii) a backward process, and (iii) a weight update process, wherein the backpropagation process is repeated for many iterations until a convergence criterion is met. A distributed SGD deep learning training process can be implemented in an HPC system using a data-parallel programming model in which the SGD training process is executed in parallel by a plurality of worker nodes executing worker processes (e.g., accelerator resources such as GPU resources) that are distributed over one or more compute nodes of the HPC system.

In data parallel training, for each iteration of a backpropagation process, a mini-batch of data samples is partitioned and evenly distributed to a plurality of worker nodes, which can reside on the same or different server machines. With data parallelism, each worker node has access to a complete copy of a current state of the deep learning model, but for each iteration, each worker node is only assigned a subset of the data samples of a current mini-batch for processing. For each iteration, each worker node executes kernel functions (via GPU devices) to perform a forward propagation of the deep learning model using its respective subset of data samples, followed by an error backpropagation process to compute the gradient of the loss with respect to the deep learning model parameters. The worker nodes perform the forward and backward propagation operations on their respective subsets of a given mini-batch dataset in parallel. The gradient parameters computed by all worker nodes for the given iteration are then aggregated/synchronized (e.g. averaged) and the averaged gradient parameters are pushed to each worker node so that each worker node can perform a parameter update process using the averaged gradient parameters to update the model parameters of the deep learning model.

Various distributed system configurations can be implemented to aggregate/synchronize the model parameters and push the averaged gradient parameters to each worker node to perform the distributed deep learning model training process. In one embodiment, a deep learning model training process can be implemented using a parameter server system to perform distributed and parallelized SGD training of a deep learning model using a cluster of accelerator devices (e.g., GPU devices). For example, FIG. 1 schematically illustrates a computing system 10 which is configured to perform distributed deep learning model training using a distributed parameter server system to synchronize and exchange model parameters between a cluster of worker nodes. FIG. 1 illustrates a computing system 10 which can be configured to decouple data pipeline tasks from the execution flow of a distributed deep learning training task, according to an embodiment of the invention.

The computing system 10 comprises a client node 50, a communications network 75 and a distributed server system 100. The client node 50 comprises a deep learning application 51 which implements methods for training a deep learning model 52 and utilizing the deep learning model 52 for inference tasks. The client node 50 further comprises a deep learning library module 53 (and application programming interfaces (APIs)), an accelerator device driver layer 54, and an accelerator virtualization layer 55. The distributed server system 100 is configured to execute various functions (e.g., distributed deep learning model training) under the control of the deep learning application 51 of the client node 50.

The distributed server system 100 comprises a parameter server system 110 comprising a plurality (S) of parameter server nodes 110-1, 110-2, ..., 110-S (collectively, parameter servers 110), a bus/communication network 120, and a worker node cluster 130 comprising a plurality (N) of worker nodes 130-1, 130-2, ..., 130-N (collectively, worker nodes 130). The parameter server nodes 110-1, 110-2, ..., 110-S manage a respective set of globally shared model parameters 112-1, 112-2, ..., 112-S. The worker nodes 130-1, 130-2, . . . , 130-N comprise respective accelerator devices 132-1, 132-2, . . . , 132-N (collectively, accelerator devices 132). The accelerator devices 132 can be implemented using any type of accelerator hardware devices such as graphics processing units (GPUs), tensor processing units (TPUs), emerging deep learning accelerators (DLAs), etc.

Each worker node 130-1, 130-2, . . . , 130-N within the cluster 130 manages a worker process which is executed by a respective accelerator device 132-1, 132-2, . . . , 132-N. A worker process can be implemented as a bare metal process, or a virtual process (e.g., a virtual machine, container application, etc.). While the parameter server system 110 can be implemented on a single compute node to store and manage all parameters of the deep learning model 52 in the single node, FIG. 1 illustrates an example embodiment of the distributed server system 100 in which the parameter server logic of the parameter server system 110 is distributed over the plurality of parameter server nodes 110-1, 110-2, . . . , 110-S, which communicate to perform model parameter processing and synchronization functions as described in further detail below. In some embodiments, the logic of the parameter server nodes 110-1, 110-2, . . . , 110-S is executed by host processors (e.g., CPUs). In other embodiments, the logic of the parameter server nodes 110-1, 110-2, . . . , 110-S is executed by the same accelerator devices 132-1, 132-2, . . . , 132-N which execute the worker processes of the worker nodes 130-1, 130-2, . . . , 130-N.

In some embodiments, the parameter server nodes 110 and the worker nodes 130 of the distributed server system 100 are separate logical nodes which execute on the same physical node (e.g., server node). In other embodiments, the parameter server nodes 110 and the worker nodes 130 of the distributed server system 100 are separate logical nodes which are distributed and executed across two or more different physical nodes (e.g., different server nodes). In this regard, the bus/communication network 120 comprises backbone networking infrastructure and communication protocols to implement one or more of various types of intra-node and/or inter-node connection topologies and communication protocols that are utilized to physically connect, and enable communication between, the hardware processor resources which execute the functions of the parameter server nodes 110 and the worker nodes 130.

For example, the intra-node connection topologies within a given physical server node can be implemented using various communication protocols such as a Remote Direct Memory Access (RDMA) protocols, an InfiniBand (TB) protocol, a Peripheral Component Interconnect Express (PCIe) protocol, a NVIDTA® NVLink™ protocol, NVIDIA GPUDirect, and other point-to-point serial interconnect protocols that enable, e.g., CPU-GPU and GPU-GPU communication. Furthermore, a given server node may implement the QuickPath Interconnect (QPI) protocol, which is a point-to-point processor interconnect framework that enables a Non-Uniform Memory Access (NUMA) architecture for a cluster of processors, etc. The inter-node connection topologies between different physical server nodes and the types of inter-node communication protocols that are used by the server nodes for network communication can include, but are not limited to, communication protocols such as TCP/IP, Gigabit Ethernet (GbE) (e.g., 10/25/40/100GbE), RDMA, IB, Message Passing Interface (MPI), etc.

The various components of the client node 50 comprise a software platform to support deep learning tasks such as deep learning model training and inference processing (or classification), which are executed on the distributed server system 100. The deep learning computing platform can be implemented using known commercially available machine learning platforms such as Tensorflow, Microsoft Cognitive Toolkit (CNTK), Apache MXNet, Caffe, and other open-source deep learning frameworks that are configured to train and deploy deep neural networks for HPC applications. The deep learning model 52 can implement one or more different types of models such as CNN models, recurrent neural network (RNN) models, region-based CNN (R-CNN) models, faster R-CNN models, mask R-CNN models, and other state-of-the-art deep learning models that are commonly utilized for high-performance deep learning computing applications.

The deep learning library module 53 comprises software libraries and APIs for one or more deep learning frameworks (e.g., Tensorflow NTK, MXNet, etc.), which include pre-written code, classes, procedures, scripts, configuration data, etc., that can be called or otherwise utilized by the deep learning application 51 executing on a host processor of the client node 50 to (i) initiate and execute various deep learning functions and tasks locally (by the host processor) and/or remotely in the distributed server system 100. The types of software libraries and APIs of the deep learning library module 53 will vary depending on the particular framework of the deep learning computing platform implemented by the client node 50.

For example, the deep learning library module 53 can implement commercially available library and/or API platforms such CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels. In particular, the NVIDIA CUDA API comprises the CUDA® Deep Neural Network library (cuDNN) and the NVIDIA cuBLAS library. As is known in the art, cuDNN is a GPU-accelerated library of primitives for deep neural networks, which provides implementations for standard routines such as forward and backward propagation operations in deep learning models comprising convolution layers, pooling layers, normalization layers, activation layers, etc. The cuDNN library is utilized by various deep learning frameworks, such as Tensorflow, CNTK, MXNet, Keras, and Caffe, to support high-performance GPU acceleration. The NVIDIA cuBLAS library is a fast GPU-accelerated implementation of the standard basic linear algebra subroutines (BLAS). The cuBLAS APIs allow an application to be accelerated by deploying compute-intensive operations to a single GPU or distributing work across multi-GPU configurations. Keras is a high-level neural network API, written in Python and capable of running on top of TensorFlow and CNTK. In one embodiment, the accelerator device driver layer 54 comprises GPU drivers that are implemented using cuDNN.

The accelerator virtualization layer 55 comprises a virtualization engine and hypervisor platform, which are configured to create virtual accelerator resources (e.g., virtual GPUs) which allow virtual machines executing on the client node 50 to access and share the physical accelerator devices 132 within the worker node cluster (or server cluster). The accelerator device drivers 54 provide virtual drivers that allow the virtual machines to access and control the virtual accelerator resources that are instantiated within the accelerator virtualization layer 55. The accelerator virtualization layer 55 allows the deep learning application 51 to provision a set of virtual accelerator resource to execute a data-parallel deep learning model training task using a hybrid set of different types of accelerator resources (e.g., GPUs, TPUs, etc.) with different performances and architectures.

In some embodiments, the deep learning application 51 implements methods to perform a distributed SGD training process to train deep learning models using a data-parallel training process executed on the distributed server system 100. As noted above, with an SGD training process, error gradients are computed for the model parameters of a deep learning model being trained using multiple iterations of a backpropagation process which comprises a sequence of three cycles including (i) a forward process, (ii) a backward process, and (iii) a weight update process, wherein the backpropagation process is repeated for many iterations until a convergence criterion is met. Each iteration of the backpropagation process is performed on a mini-batch of data, wherein a mini-batch of data comprises a subset (or portion) of a total dataset of model training data.

With a data parallel SGD model training process, the host system will access mini-batches of a training dataset from persistent storage, and store the mini-batches of data in a host system memory. For a given iteration of an SGD deep model training process, a given mini-batch of data (M data samples) is accessed from host system memory and evenly distributed among the plurality of worker nodes 130-1, 130-2, . . . , 130-N, such that M/N data samples of the given mini-batch of data are transferred and copied to the memory of each accelerator device 132-1, 132-2, . . . , 132-N. During the data parallel deep learning model training process, each worker node 130 has access to a complete, updated copy of the given deep learning model being trained, which is maintained in the data stores of globally shared model parameters 112-1, 112-2, . . . , 112-S maintained by the respective parameter server nodes 110-1, 110-2, . . . , 110-S. The globally shared parameters represent the model parameters (e.g., dense/sparse vectors, weights, etc.) that are computed by worker nodes 130 during a training phase, and aggregated/combined/synchronized by the parameter server nodes 110.

During the deep learning model training process, the worker nodes 130-1, 130-2, . . . , 130-N execute kernel functions on the respective accelerator devices 132-1, 132-2, . . . , 132-N to perform the forward, backward, and a weight update cycles of the backpropagation process. For each iteration backpropagation process, each worker node 130-1, 130-2, . . . , 130-N utilizes its local subset of mini-batch data to execute a forward propagation process on the deep learning model, followed by error backpropagation to compute gradients of the loss with respect to the deep learning model parameters. In particular, the feed forward operation (forward process) is performed to process the subset of mini-batch data, layer by layer, using the given deep learning model. Once the information reaches the final output layer of the deep learning model, an error signal is calculated and back propagated through the layers of the deep learning model using a backward process, which involves minimizing an objective function by calculating error gradients with respect to model parameters (e.g., weights) and the input data. In this manner, for the given iteration, each worker node 130 computes a set of gradients of the deep learning model based on its local subset of the mini-batch of training data.

Following the forward and backward operation for the given iteration, each worker node 130 will communicate with one of the parameter server nodes 110 to send the locally computed parameters (gradients) to parameter server node 110. In some embodiments, there is one parameter server node 110 for each worker node 130. In other embodiments, each parameter server node 110 is assigned to two or more worker nodes 130. Each parameter server node 130 will receive a set of locally computed parameters from one or more associated worker nodes 130. The parameter server nodes 110-1, 110-2, . . . , 110-S will then communicate with each other (via an inter-PS communication protocol) to aggregate the local parameters (e.g., compute global average gradients) and update the deep learning model parameters, and then push the updated deep learning model parameters to the worker nodes 130.

For example, in some embodiments, the parameter server nodes 110-1, 110-2, . . . , 110-S send the local computed parameters (gradients) to one of the parameter server nodes 110 (all gather operation) which is designed to perform an all-reduce operation. The designated parameter server node 110 performs an all-reduce operation on the aggregated parameters by computing an average of all the local gradients provided by the worker nodes 130 for the given deep learning training iteration. The globally shared parameters 112-1, 112-2, . . . , 112-S on each of the parameter server nodes 110 are then globally updated with the computed gradient average, and each parameter server node 110 pushes the global updated parameters to the worker nodes 130. The worker nodes 130 then proceed to use the global updated parameters to perform a weight update process for the given iteration of the deep learning model training process. In this manner, the model parameters are managed and synchronized by the plurality of cooperating parameter server nodes 110 that collectively update the globally shared model parameters 112-1, 112-2, . . . , 112-S, which are shared across the worker nodes 130. With this framework, all state that is shared among the worker nodes 130 (i.e. the deep learning model parameters being learned) is maintained and synchronized by the parameter server nodes 110. At the end of each mini-batch iteration, each worker node 130 has a complete copy of the most recent (intermediate) deep learning model. A data-parallel training process is performed over a plurality of training epochs. For each epoch, the parameters of the deep learning model 52 are trained using the entire training dataset. The number of epochs will vary depending the desired results. For example, the number of epochs may be performed until a validation accuracy of the deep learning model 52 starts to decrease.

A typical deep learning training task is both computation and communication intensive especially for a distributed deep learning model training process which is implemented across multiple server nodes and accelerator devices in a client-server system such as shown in FIG. 1. In the client-server system of FIG. 1, the deep learning application 51 executing on a processor (e.g., CPU) of the client node 50 will control and orchestrate data access and pre-processing operations, as well as the execution flow of the deep learning model training process. In particular, the client node 50 will perform data access operations (I/O operations) to access training data from a local or a remote data storage system and load the training data into system memory of the client node 50 to execute data pre-processing operations. As is known in the art, data pre-processing is necessary when training deep learning models for model generalization and accuracy. These data pre-processing operations include, for example, data whitening, and data augmentation such as random rotations, shift operations and flip operations.

A client-server system such as shown in FIG. 1 presents various challenges with respect to distributed computing for HPC applications such as distributed deep learning model training. For example, the client-server system requires a significant amount of data to be moved from storage to the client node 50 for pre-processing, and a significant amount of pre-processed data to be moved from the client node 50 to the distributed server system 100. Since the training data is pre-processed in a random manner, the pre-processed data is different for each iteration and, therefore, it is not feasible to cache the data at a server.

Moreover, the data pre-processing consumes a significant number of CPU cores. In this regard, as the number of accelerator resources (e.g., virtual GPUs and/or physical GPUs) are used to perform data-parallel operations, the more CPU cores and processing is required, otherwise the data pre-processing functions that are executed by the client-side CPUs can present a bottleneck in the deep model training process. For example, assuming a mini-batch size of 64 samples, and a batch number of 10K, depending on the tensor size and the CNN model utilized (e.g., AlexNet, Resnet50, Inception3, VGG16), there can be a total amount of data ranging from 300 GB to 700 GB that is transferred from the client node 50 to the distributed server system 100 over the networks 75 and 120, which can present a significant load on the network bandwidth.

Furthermore, one or more nodes, e.g., client node and/or server node, can become overloaded and present a bottleneck in the through-put of the deep model learning task. For example, there can be a circumstance where many deep learning client systems are currently sharing the same GPU server node. In this instance, the shared GPU server node is prone to be overloaded. As a further example, a given client node can be executing a given deep learning task using a large number of GPU server nodes (e.g., 8 or 16 server nodes). In this instance, the client system is prone to be overloaded with respect to CPU data pre-processing and sending the pre-processed data to the server nodes, and the GPU server nodes may be waiting to receive pre-processed data from the single client system. As such, the deep learning tasks executed by the GPU server nodes are delayed, which leads to inefficient and underutilization of the server nodes and other resources in the server cluster.

In accordance with embodiments of the invention, systems and methods are provided to execute HPC tasks (e.g., deep learning model training process) in a distributed computing environment by decoupling the task execution flow and data processing flow in an out-of-bind manner. An orchestrated data pipeline is dynamically configured using different logical nodes to handle the data processing flow in a resource-efficient manner across the distributed computing environment. For example, for a deep learning task executed by GPU devices, the deep learning execution flow may comprise GPU CUDA function calls that run a deep learning model training job. These functions calls are typically small in size and are latency sensitive. On the other hand, the data processing flow involves accessing and processing large amounts of raw data (e.g., training data) to generate tensors that are relatively large in size and require high bandwidth for data movement between nodes.

In accordance with embodiments of the invention, data processing pipelines are dynamically composed by mapping different pipeline tasks to different logical nodes to better exploit various types of resources to achieve load balancing and scalability. For example, in the context of deep learning tasks and other similar types of HPC tasks, the logical nodes can include various types of nodes such as data input/output (I/O) nodes, data pre-processing nodes, data staging nodes, etc. Data staging allows you to stage data needed by a job before the job begins execution. In addition, logical nodes may co-exist in one node (e.g., one server), e.g., data storage, pre-processing, and staging nodes can co-exist in one node. Further, logical nodes can have multiple instances, which are shared among jobs.

A data pipeline is orchestrated and optimized to achieve higher throughput and resource utilization. In one embodiment, a data pipeline is orchestrated by a client for a specific job by, e.g., launching data loading, pre-processing, training mini-batch. Data processing pipelines are configured to exploit data prefetching, in-parallel and asynchronous pre-processing, to hide latency. Moreover, shared or local storage systems can be utilized in a data pipeline for data I/O to minimize or eliminate data moving. In addition, high-performance, low latency memory systems can be utilized for temporary data staging operations, wherein the memory systems are implemented using non-volatile random-access memory (NVRAM) using an interface specification such as Non-Volatile Memory Express (NVMe) which allows fast access for direct-attached solid state devices, or a network protocol such as NVMe over Fabrics (NVMeOF) for communicating between a host and a storage system over a network fabric.

Figure 2:
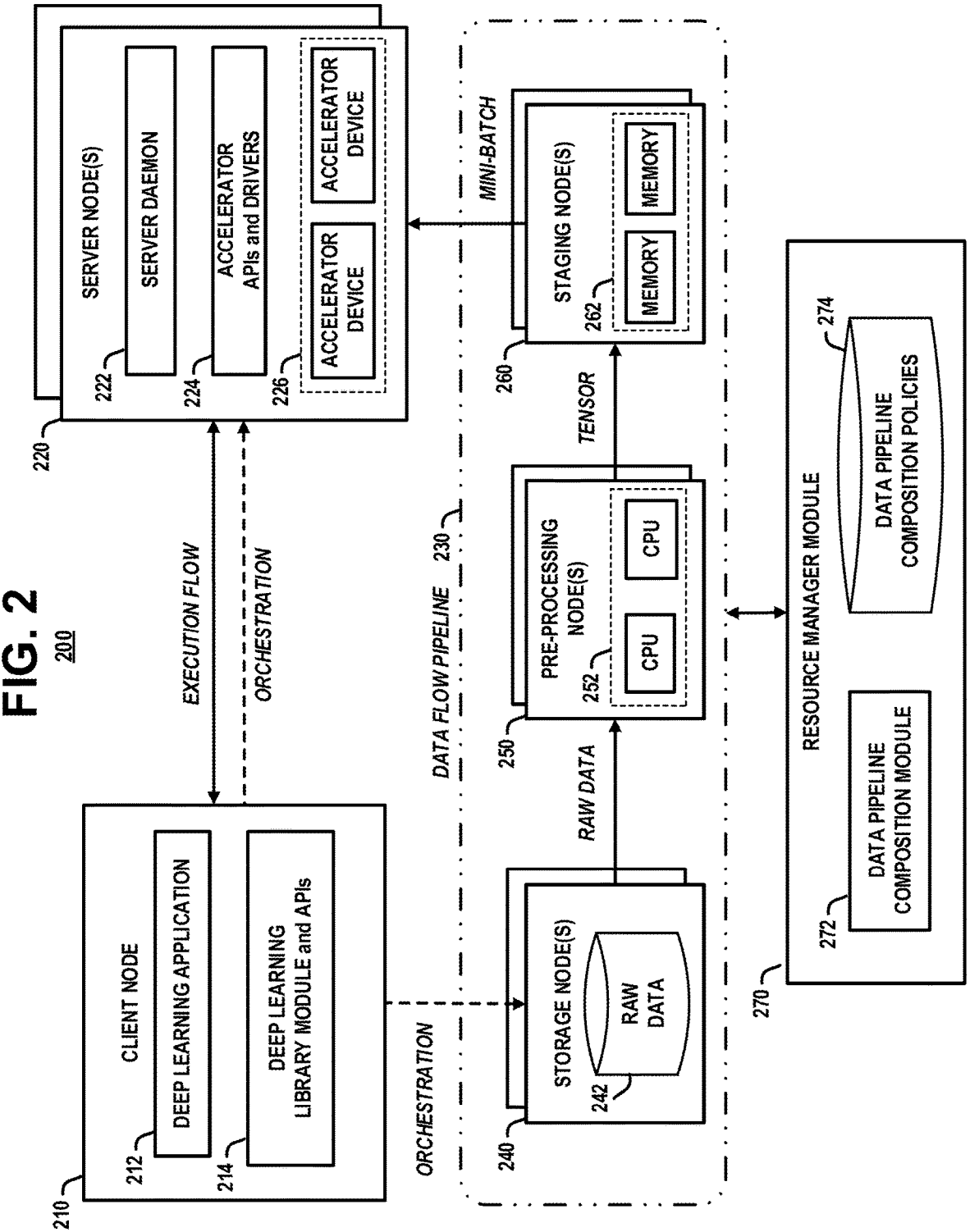
FIG. 2 schematically illustrates a system for decoupling a data flow pipeline from the execution flow of a high-performance computing task, according to an embodiment of the invention.

FIG. 2 schematically illustrates a system for decoupling a data flow pipeline from the execution flow of a high-performance computing task, according to an embodiment of the invention. In particular, FIG. 2 schematically illustrates a distributed computing system 200 comprising a client node 210, one or more server nodes 220, and a data flow pipeline 230 comprising a plurality of logical nodes which comprise one or more storage nodes 240, one or more data pre-processing nodes 250, and one or more data staging nodes 260. The computing system 200 further comprises a resource manager module 270. FIG. 2 illustrates an exemplary embodiment for executing a distributed deep learning model training task, wherein the client node 210 comprises a deep learning application 212 and a deep learning library module 214 to orchestrate the execution flow of a deep learning model training job with the server nodes 220, as well as orchestrate data I/O and pre-processing within the data flow pipeline 230. While only one client node 210 is shown for illustrative purposes, multiple client nodes can be instantiated to run a deep learning training job using a framework such as Tensorflow.

Each server node 220 comprises a server daemon 222, accelerator device APIs and drivers 224, and one or more accelerator devices 226. The sever nodes 220 comprise the logical nodes which provide XaaS to execute HPC jobs using the accelerator devices 226. The accelerator devices 226 include, for example, GPU devices, TPUs, (DLAs), and other specialized hardware accelerator resources that are configured to support high-performance computing services. The server daemon 222 executes HPC tasks (e.g., deep learning model training tasks) in response to service requests or function calls (e.g., remote procedure calls) received from the client node 210 as part of the execution flow orchestrated by the client node 210. The server daemon 222 utilizes the accelerator APIs and drivers 224 to access and utilize the accelerator devices 226 to execute the HPC tasks requested by the client node 210.

In the data flow pipeline 230, the storage nodes 240 comprise the logical nodes that store raw data 242 which is utilized for executing an HPC job. For example, in the context of deep learning model training, the raw data 242 comprises the raw training dataset which is used to train a deep learning model. In one embodiment, the storage nodes 240 comprise nodes of a data storage system which support a distributed file system protocol such as the Network File System (NFS) protocol, which allows the client node 210 to access the raw data as files over a computer network. For example, the storage nodes 240 may comprise logical nodes within a storage I/O system that is implemented using the Dell™ NFS Storage Solution (NSS). NSS provides NFS storage as part of an appliance that includes an NFS gateway server and direct-attached storage (DAS) enclosures.

Each data pre-processing node 250 comprises a server node having one or more processors 252 (e.g., central processing units) which perform data pre-processing operations on portions of the raw data accessed from the storage nodes 240. In one exemplary embodiment, the data pre-processing nodes 250 can be implemented using the Dell EMC PowerEdge (PE) line of servers. In the context of deep learning model training, the data pre-processing functions that are performed by the processors 252 of the data pre-processing nodes 250 include various types of data processing functions that are commonly performed on a raw training dataset for deep learning model training including, but not limited to, decoding (e.g., converting JPEG files to raw RGB (red, green, blue) samples), data re-sizing, normalization, whitening, data augmentation operations (e.g., data rotations, shifts, flips), etc. For instance, image augmentation methods are applied to images within a training dataset to create multiple altered versions of the same image, thereby providing more images to use for the training process to enhance the accuracy of the deep learning model and thus, allow for enhanced classification/inference processing.

The data pre-processing nodes 250 convert the pre-processed data to data structures (e.g., tensors) which represent the pre-processed data with associated data labels. The data structures (e.g., tensors) are serialized and stored in a staging area as, e.g., an in-memory file, in the staging nodes 260. Each staging node 260 comprises memory devices 262 for caching/storing the tensors that are generated by the data pre-processing nodes 250. In one embodiment, the staging nodes 260 comprise server nodes, and the memory devices 262 comprise system memory of the server nodes. The memory devices 262 comprise, e.g., volatile random-access memory (RAM), non-volatile random-access memory (NVRAM), and other types of solid-state memory devices such as NAND flash memory or other types of Non-Volatile Memory Express (NVMe) solid-state drive (SSD) devices. The memory devices 262 can be accessed using the NVMe interface specification for access to direct-attached solid state devices using high-speed PCIe connections and/or the NVMe over Fabrics (NVMeOF) network protocol which allows host systems to access remote memory over a network (e.g., fabric) using remote direct memory access (RDMA) technologies such as InfiniBand, RDMA over Converged Ethernet (RoCE), Internet Wide-Area RDMA Protocol (iWARP), etc.

The resource manager module 270 comprises a data pipeline composition module 272 and a database of data pipeline composition policies 274. The resource manager module 270 implements methods to schedule and provision computing resources in the distributed computing environment for executing HPC tasks. In an accordance with embodiments of the invention, the data pipeline composition module 272 implements methods for dynamically composing data flow pipelines (e.g., the data flow pipelines 230 of FIG. 1) by scheduling and provisioning logical nodes to execute data I/O, pre-processing, and staging operations, which are separate from the execution flow, of an HPC task. The data flow pipelines are dynamically composed based on, e.g., predefined pipeline composition policies that are maintained in the database of pipeline composition policies 274.

The data pipeline composition policies 274 can include pre-defined policies of the service provider or administrator of the computing system and/or customer-defined or user-defined policies that are specified by customers or users for executing HPC tasks.

More specifically, in some embodiments, the data pipeline composition policies 274 provide information which specifies how to decouple and compose a data flow pipeline using different logical nodes, and how many instances of the logical nodes should be launched to compose the data flow pipeline. For example, one policy setting (e.g., policy setting1) may specify that the logical nodes for pre-processing and staging should co-exist on a given node (e.g., client node, GPU server, or server node independent from the client node and GPU server node, etc.). A further policy setting (e.g., policy setting2) may specify that the logical nodes for storage, pre-processing, and staging should co-exist on the same node, etc. The policy templates may integrate with the resource manager module 270 as the resource manager 270 is aware of the current resource status of the cluster, e.g., how many GPU nodes and CPU nodes are available on which the components (e.g., logical nodes) of the data pipeline can be instantiated. When a client or user commences a deep learning job, the client or user can select a specific policy setting, and then optionally customize the specific setting based on, e.g., a user-specified number of pre-processing/staging node instances to utilize in the data flow pipeline.

The resource manager module 270 can be implemented using known platforms for managing and distributing services in a distributed computing system. For example, in one embodiment, the data pipeline composition module 272 can be implemented using the Kubernetes (K8S) container management technology to manage containerized applications in physical, virtual, and cloud infrastructure environments. In another exemplary embodiment, the data pipeline composition module 272 can be implemented using the Apache Mesos platform which utilizes Linux control groups (cgroups) to provide isolation for CPU, memory, I/O and file system in a distributed computing system to manage and distribute services. The Linux cgroups are a kernel feature which limits, manages, and isolates resource usage (e.g., CPU, memory, disk I/O, network, etc.) of a collection of executing processes.

In the exemplary embodiment of FIG. 2, the resource manager module 270 provisions logical nodes and resources across the server cluster to dynamically compose the data flow pipeline 230, and the client node 210 orchestrates the data I/O, pre-processing, and staging operations that are performed by the logical nodes of the data flow pipeline 230. The data pipeline composition module 272 dynamically composes data flow pipelines for HPC tasks (e.g., deep learning model training) so that components of the data pipeline can be flexibility decoupled and placed on different nodes, and allow the data flow pipeline and deep learning tasks to be well coordinated by a central point. In this regard, cluster wide resources, including storage nodes for I/O, CPU nodes for pre-processing, and server nodes (e.g., GPU nodes) for deep learning model training, can be better utilized in a more balanced way, improving the performance and scalability. The decoupling of the execution flow and data processing flow allows the different flows to be separately optimized. In addition, the decoupling of the execution and data flows hides latency and increases throughput of data parallelism as the raw data for a next mini-batch iteration can be asynchronously prefetched, pre-processed, and loaded to the memory of the server node(s) performing deep learning model training tasks, while the current mini-batch iteration for the deep learning model training task is being performed by the server node(s).

Furthermore, the data pipeline composition techniques provide scalability with the provisioning of logical nodes across server clusters, wherein the different stages, e.g., data I/O, data pre-processing, and data staging, can be implemented using multiple instances of logical nodes that run in parallel. The provisioning of logical nodes for a data flow pipeline provides a mechanism to reduce network pressure by, e.g., performing data pre-processing operations on one or more logical nodes that are close to the storage node(s) 240 or close to the server node(s) 220 which perform the HPC task execution.

FIG. 2 illustrates an exemplary embodiment in which the different stages of the data flow pipeline 230 (e.g., storage nodes 240, pre-processing nodes 250, and staging nodes 260) are performed by logical nodes that are provisioned on different server nodes. In this instance, the logical nodes are network connected and communicate using, e.g., RDMA, TCP, etc. In other embodiments, the logical nodes of two or more stages of a data pipeline can co-exist on a given server node, wherein the logical nodes communicate through mechanisms such as memory sharing or RPC, etc. For example, FIGS. 3, 4, and 5 schematically illustrate various embodiments for implementing a data flow pipeline with different configurations of logical nodes that co-exist to reduce cross-node data movement.

Figure 3:
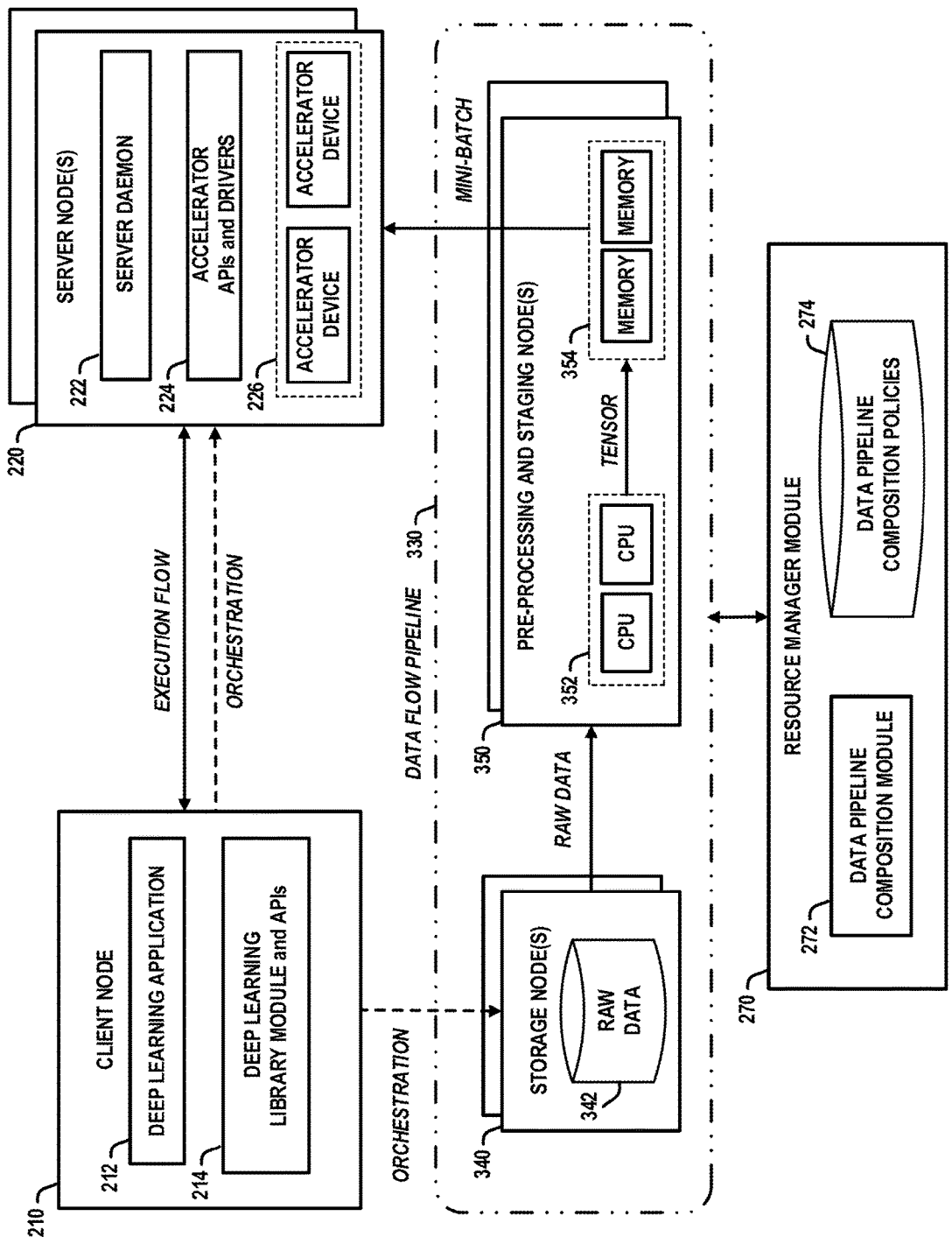
FIG. 3 schematically illustrates a system for decoupling a data flow pipeline from the execution flow of a high-performance computing task, according to another embodiment of the invention.

In particular, FIG. 3 schematically illustrates a system 300 for decoupling a data flow pipeline from the execution flow of a high-performance computing task, according to another embodiment of the invention. The system 300 of FIG. 3 is similar to the system 200 of FIG. 2, except that the system 300 comprises a data flow pipeline 330 comprising one or more logical nodes that are configured as storage nodes 340 to store raw data 342, and one or more logical nodes that are configured as pre-processing and staging modes 350. In this embodiment, the data pre-processing and data staging nodes co-exist on a server node. Each pre-processing and staging node 350 comprises a plurality of CPUs 352 to perform data pre-processing functions, and a plurality of memory devices 354 to perform data staging operations. Each data pre-processing and staging node 350 can be configured to asynchronously pre-process raw data 342 obtained from the storage node(s) 340 and cache the pre-processed data (e.g., tensor), wherein the cached tensor data is subsequently pre-loaded as a mini-batch to memory of the server node(s) 220 for processing.

Figure 4:
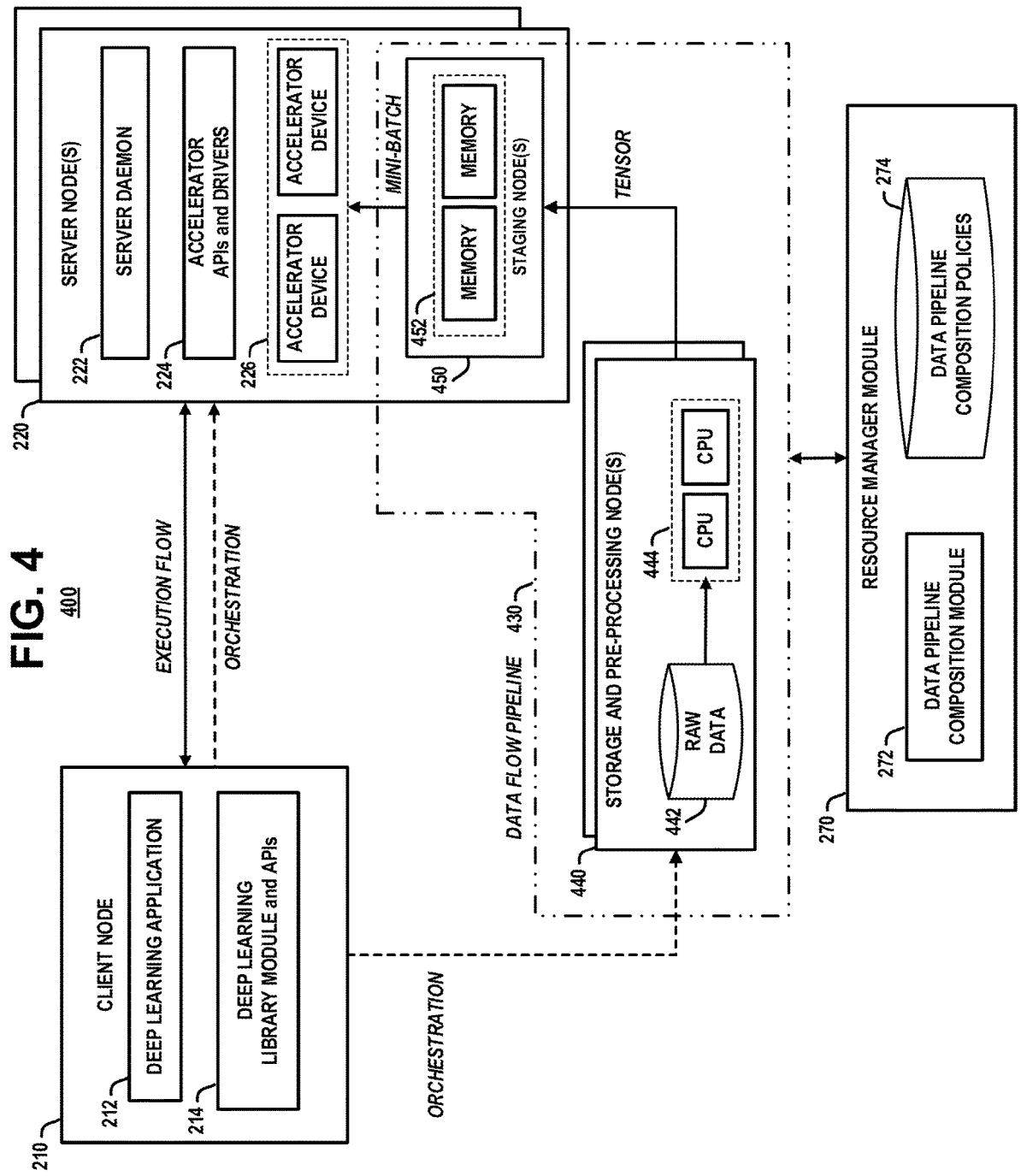
FIG. 4 schematically illustrates a system for decoupling a data flow pipeline from the execution flow of a high-performance computing task, according to another embodiment of the invention.
Figure 5:
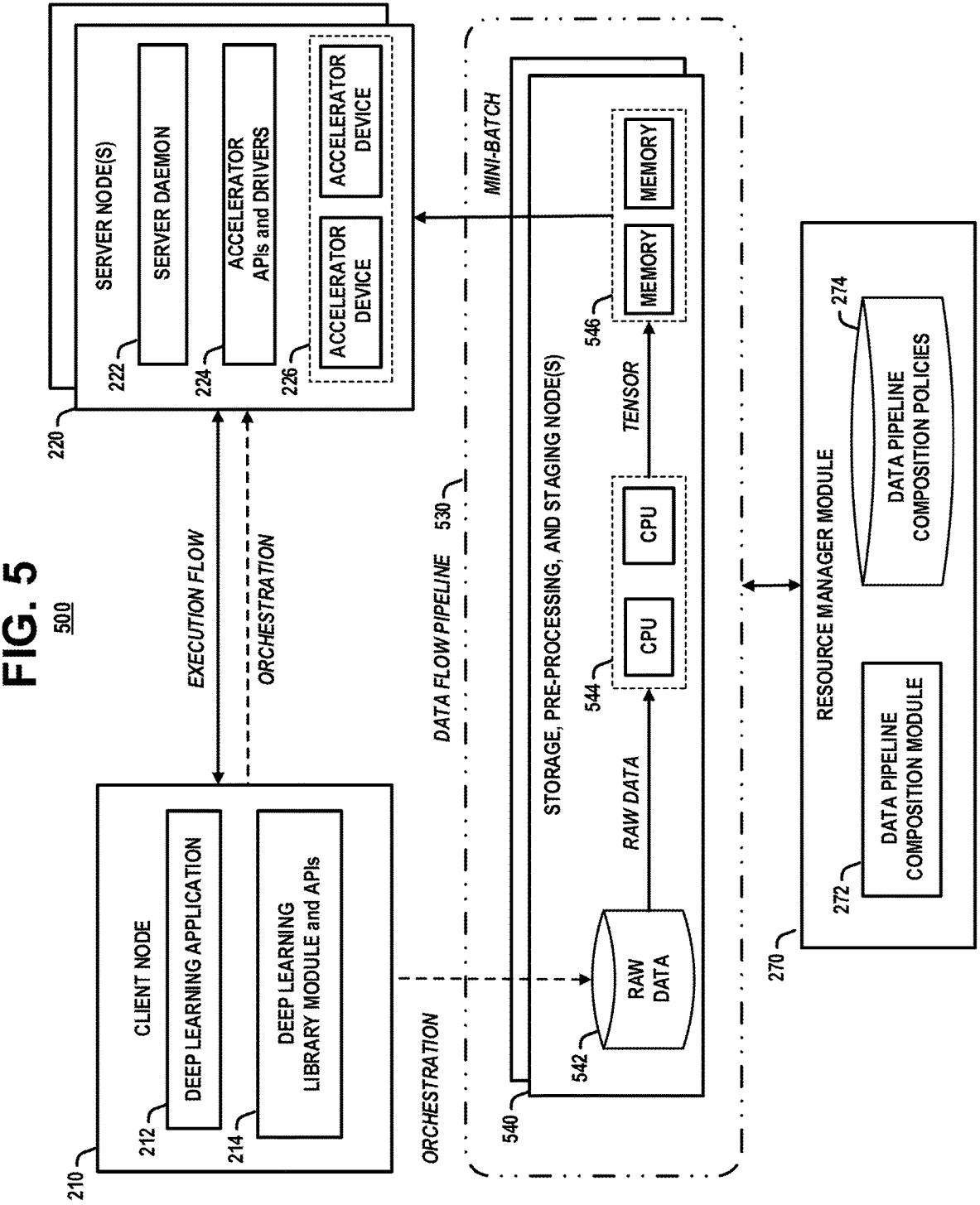
FIG. 5 schematically illustrates a system for decoupling a data flow pipeline from the execution flow of a high-performance computing task, according to another embodiment of the invention.

FIG. 4 schematically illustrates a system 400 for decoupling a data flow pipeline from the execution flow of a high-performance computing task, according to another embodiment of the invention. The system 400 of FIG. 4 is similar to the system 200 of FIG. 2, except that the system 400 comprises a data flow pipeline 430 comprising one or more logical nodes that are configured as a storage and pre-processing node 440, and one or more data staging nodes 450 that are provisioned in the server nodes 220. In this embodiment, the logical data storage and pre-processing node(s) 440 co-exist on a given node (e.g., storage node). Each data storage and pre-processing node 440 comprises storage for raw data 442 and a plurality of CPUs 444 to perform data pre-processing functions on the raw data 442. In one embodiment, the logical storage and pre-processing node(s) 440 co-exist on a data storage node, wherein the data pre-processing functions are executed locally on the data storage node.

In addition, the data staging node(s) 450 are implemented using memory 452 which resides on the server node(s) 220 that perform the deep learning model training tasks. In this embodiment, the tensors that are generated by the logical storage and pre-processing node(s) 440 are cached in a staging area of the memory 452 of the server node(s) 220, wherein the cached tensor data is subsequently pre-loaded as a mini-batch to memory of the accelerator devices 226 for processing.

FIG. 5 schematically illustrates a system 500 for decoupling a data flow pipeline from the execution flow of a high-performance computing task, according to another embodiment of the invention. The system 500 of FIG. 5 is similar to the system 200 of FIG. 2, except that the system 500 comprises a data flow pipeline 530 comprising one or more logical nodes that are configured as a data storage, pre-processing, and staging node 540. Each logical node 540 comprises a raw data storage 542, a plurality of CPUs 544 to execute data pre-processing functions, and memory 546 for comprising a staging area for storing the tensors. In one embodiment, the logical data storage, pre-processing, and staging nodes co-exist on a given data storage node, wherein the data pre-processing functions and staging operations are performed locally on the data storage node.

It is to be understood that FIGS. 2, 3, 4 and 5 schematically illustrate a few illustrative embodiments for configuring a data flow pipeline separate from an execution flow, and that other data flow pipeline configurations can be implemented. For example, in one embodiment, the logical nodes for the data storage, pre-processing and staging operations can co-exist on a given client node. In another exemplary embodiment, the logical nodes for the data storage, pre-processing and data staging operations can co-exist on a given server node (e.g., GPU server node). In yet another exemplary embodiment, the logical nodes for the data storage and pre-processing operations can co-exist on a given client, while the logical nodes for the data staging operations can exist on one or more nodes (e.g., GPU server nodes or other compute nodes of a cluster) which are separate from the client node.

Figure 6:
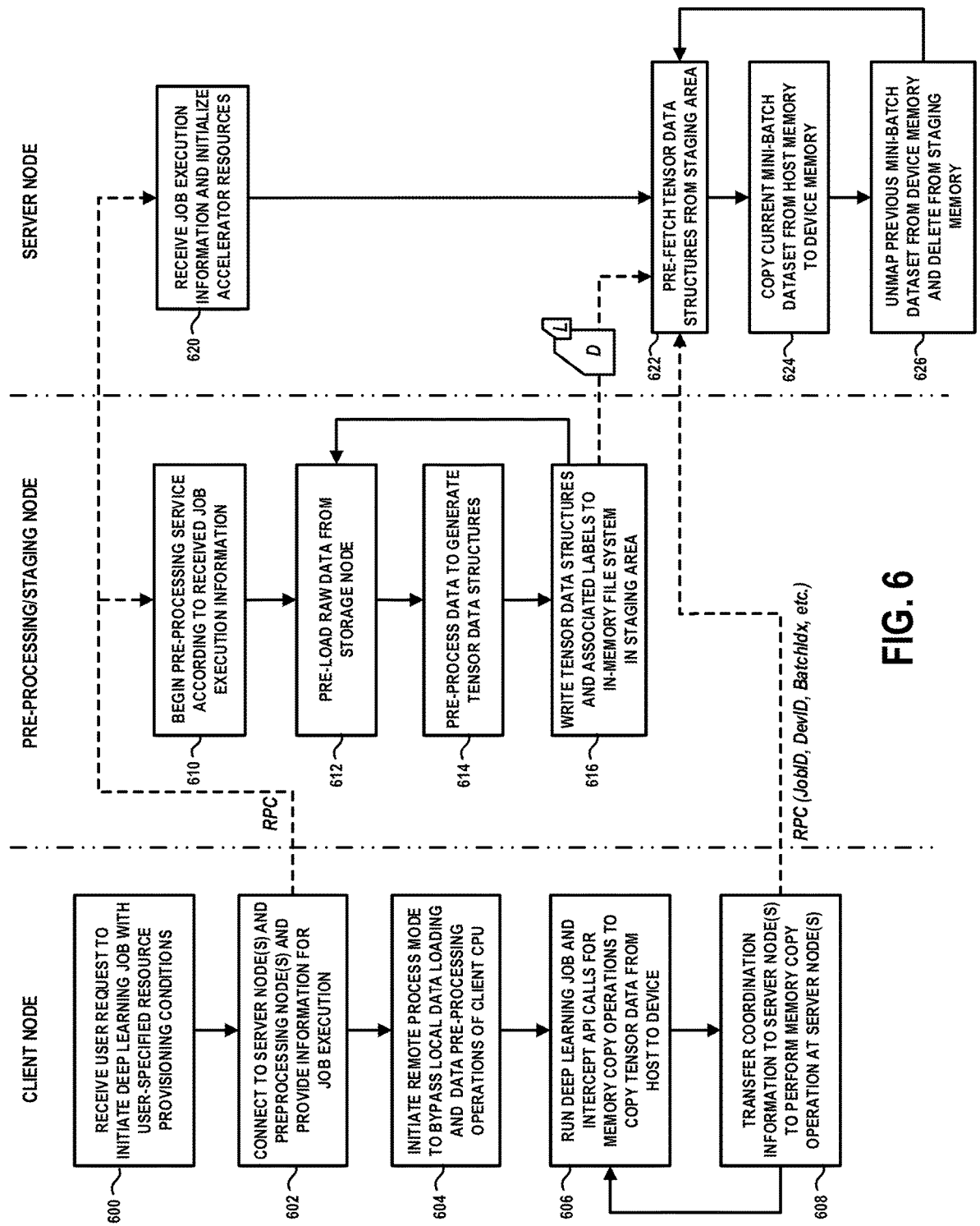
FIG. 6 is a flow diagram of a method for composing and implementing a data flow pipeline which is decoupled from the execution flow of a high-performance computing task, according to an embodiment of the invention.

FIG. 6 is a flow diagram of a method for composing and implementing a data flow pipeline which is decoupled from the execution flow of a high-performance computing task, according to an embodiment of the invention. For purposes of illustration, the method of FIG. 6 will be discussed in the context of executing a deep learning model training process using GPU resources in a distributed computing system with a data pipeline configuration as shown in the exemplary embodiment of FIG. 3. FIG. 6 illustrates an orchestrated process flow that occurs between a client node, a data pre-processing/staging node, and a server node. The client node executes a process flow which comprises blocks 600, 602, 604, 606 and 608, the data pre-processing/staging node executes a process which comprises blocks 610, 612, 614, and 616, and the server node executes a process which comprises blocks 620, 622, 624, and 626, wherein the different process flows are executed concurrently in parallel.

Initially, the client node receives a user request to initiate a new deep learning job (e.g., a deep learning model training job) with user-specified resource provisioning conditions and parameters (block 600). A service request can include various user-specified conditions and parameters for executing a deep learning model training job associated with the service request. For example, a service request may specify: (i) a desired number (N) of accelerator devices (e.g., GPU devices) to provision for the requested job, (ii) a specific type/model of accelerator device (e.g., NVIDIA P100 GPU, Tensor flow TPU, etc.) to be utilized for the requested job, (iii) whether the provisioned accelerator devices should be exclusively allocated for the requested job or can be shared with other jobs, (iv) the type of deep learning model to be trained (e.g., deep convolutional neural network such as ResNet-50); (v) the mini-batch size (e.g., 64 images per iteration); (vi) the total number of mini-batches per training epoch (e.g., 10K mini-batch iterations); (vii) the location of the raw training data to be processed (e.g., a data Uniform Resource Identifier (URI), a path to a data storage directory in an NFS server, etc.); (viii) the server node(s) to utilize for data pre-processing; and/or (ix) other conditions based on a service level agreement (SLA). In addition, the provisioning of accelerator resources for pending jobs can be based on predefined policies of the service provider of the accelerator service platform for handling specific types of jobs.

Furthermore, in the context of GPUaaS, the GPU server node information (e.g., IP:port, which can be a local host or remote node) is exported so that GPU requests during the execution of the deep learning application on the client node are intercepted by the deep learning APIs and forwarded from the client node to the appropriate server node (e.g., GPU server node). In another embodiment, a resource manager module 270 (FIG. 3) can be configured to schedule and provision the appropriate GPU server node(s) and pre-processing/staging node(s) and return the login information to the client node.

Next, the client node will internally connect to the allocated pre-processing/staging node(s) and server node(s) and provide relevant information for job execution (block 602). For example, the client node will provide relevant information such as the job ID (e.g., a universally unique identifier (UUID)), the directory or path to the raw data to be processed, the mini-batch size, the number of mini-batch iterations, the number of accelerator devices (e.g., GPU devices) to utilize for the deep learning model training job, etc. In one embodiment, the client node will communicate with the pre-processing/staging node and the server node using a remote procedure call (RPC) protocol in which the client node sends a request message to the remote nodes to execute a specified procedure with supplied parameters.

In response to the RPC request message received from the client node, the data pre-processing/staging node commences a data pre-processing service based on the specified parameters (block 610). Furthermore, in response to the RPC message received from the client node, the server node(s) begin to instantiate and bind the accelerator resources (e.g., GPU devices, virtual GPUs, etc.) to be used for performing the deep learning computing tasks based on the received job execution information (block 620).

In the pre-processing/staging node(s), the data pre-processing service begins to pre-load the raw data from a target storage node based on the specified data URI (block 612). The raw data can be stored and accessed from, e.g., a local data storage of the pre-processing node, or from a remote data storage node of a distributed file system (e.g., network file system (NFS), Hadoop Distributed File System (HDFS), etc.), a cloud-based storage system (e.g., S3 object storage accessed through a web services interface), etc. In one embodiment, the data access and pre-loading operations are performed using multiple threads to prefetch the relevant data and temporarily store the pre-fetched data to a local directory.

The data pre-processing/staging node pre-processes the raw data to generate tensor data structures (block 614) and then write the pre-processed data and associated labels to a staging area (block 616). The pre-processing/staging node executes pre-processing logic to perform a process which comprises, e.g., reading a sufficient amount of raw data into memory, pre-processing the raw data, and generating tensor data structures from the pre-processed data. For example, the raw data is divided into mini-batches based on the predefined mini-batch size, and a plurality (N) of mini-batches of data can be loaded into memory for pre-processing (where N can be predefined, e.g., N=8). As noted above, the data pre-processing operations include various types of data processing functions that are commonly performed on raw data for deep learning model training jobs including, but not limited to, decoding (e.g., converting JPEG files to raw RGB samples), data re-sizing, normalization, whitening, data augmentation operations (e.g., data rotations, shifts, flips), etc. The pre-processed data is then converted to data structures (e.g., tensors) which represent the pre-processed data (D) with associated data labels (L), as schematically illustrated in FIG. 6.

With regard to data staging operations, in one embodiment, the pre-processed data (e.g., tensor data structures and associated labels) is serialized and written to an in-memory file system with a predefined naming scheme. The predefined naming scheme can specify information such as the JobID, DeviceID, BatchID (e.g., JobID/Data-DevID-BatchID, or JobID/Label-DevID-BatchID, etc.). In one exemplary embodiment, the tensor data structures and associated labels can be serialized and stored in a temporary file storage facility (tmpfs) on a Unix-like operating system (e.g., Linux). The tmpfs appears as a mounted file system, but stored in volatile memory instead of a persistent storage device.

Subsequent to the initial communication (block 602) with the data pre-processing/staging and server nodes, the client node will automatically enable a remoteProcess mode to orchestrate the job execution while bypassing local data loading and pre-processing functions of the CPU on the client node (block 604). In particular, the client node would execute the deep learning application process flow in the proper programmatic sequence, but would bypass data loading and pre-processing operations so that the local CPUs of the client node would not perform such functions, but while running the pipeline in a normal manner (e.g., loading, pre-processing, training).

In one embodiment, a remoteProcess mode is implemented (e.g., a wrapper process) to bypass local data loading and pre-processing operations on the client node and to perform other functions for orchestrating the execution and data flow operations at remote nodes. More specifically, in one embodiment, special dataset types are implemented, such as fakeData/fakeLabel, which are generated in-memory to bypass local disk loading and pre-processing operations, but which have the requested NWHC format (batchNum-Width-Height-Channel) data shape like 64*224*224*3, wherein N denotes a number samples (e.g., images) in the batch, H denotes a height of the image, W denotes a width of the image, and C denotes a number of channels of the image (ex: 3 for RGB, 1 for grayscale, etc.). The fake data sets (e.g., data and labels) are populated with special, pre-defined data patterns such as data with 0xBADEFACE and labels with 0xFACEBABA, etc. This implementation requires no change to the deep learning model logic or the deep learning framework.

The client orchestrates the deep learning model training iterations. For each iteration, a mini-batch dataset comprising one or more tensors and associated labels are fed to the server node(s) for processing by the accelerator resources of the server node(s). These data feed operations are coordinated using an API call such as a CUDA host-to-device memory copy operation (e.g., cuMemcpyHtoD(devPtr, hostPtr, size, stream)) which is invoked at the client node. In particular, while running the deep learning application on the client node, the client node will intercept API calls for, e.g., memory copy operations to copy tensor data from host to device (block 606). When such an API is intercepted by the client node, a memory comparing operation is performed to compare the size information and data patterns associated with the API call to the size and data patterns of the fake data structures to determine if the API call is associated with tensor data.

If the API call information matches the pre-defined data contents, the API call is determined to be associated with the data tensors or labels. The client node will then transfer coordination information to the server node(s) to have the host-to-device memory copy operations performed at the server node(s) (block 608). In one embodiment, the coordination information comprises, e.g., jobID, data|label ID, devID, batchID, etc. This coordination information comprises only dozens of bytes of information, as compared to the tens of megabytes that would be needed to transmit pre-processed data (e.g., tensors) from the local memory of the client node to the device memory of the accelerator devices on the server nodes. In one exemplary embodiment, the library module of the client node intercepts CUDA API calls, detects flags and then transmits the coordination information to the server node(s) (e.g., GPU server nodes) via RPC. During the iterative process (repeating blocks 606 and 608), the batch index number (e.g., batchID) increases for each next iteration.

In response to receiving coordination information from the client node, the server node will pre-fetch relevant tensor data structures and associated label information from the staging area into the system memory of the server node (block 622). The server node could asynchronously pre-load the corresponding tensors from the staging area of the pre-processing/staging node and feed the tensors for the current mini-batch into the accelerator devices (e.g., GPUs). The server node can read (and memory map) a next mini-batch of pre-process data from, e.g., a NFS file. Such reading can be done using a pre-defined file name such as jobID/data-devID-batchID, or reading can be done through RDMA. The server node will perform host-to-device memory copy operation to copy a current mini-batch data set to memory of the accelerator devices for processing (block 624). Once the memory copy operation is complete, the server node can unmap the previous tensor file from the accelerator memory and delete such tensor file from the staging memory (block 626).

During the deep learning model training job, the data pipeline would continue the data loading, data pre-processing, and tensor serializing/staging operations until the pre-specified mini-batch number is reached. In one embodiment, the data loading, data pre-processing, and tensor serializing/staging operations execute in parallel on a plurality of logical nodes that are instantiated for the pre-processing and staging operations. The server daemon of the server node would repeat the various operations of blocks 622, 624 and 626 during a given training epoch, wherein the server daemon of the GPU server node consumes the in-memory tensor files, and delete the in-memory tensor files after accessing and using the tensor files.

Figure 7:
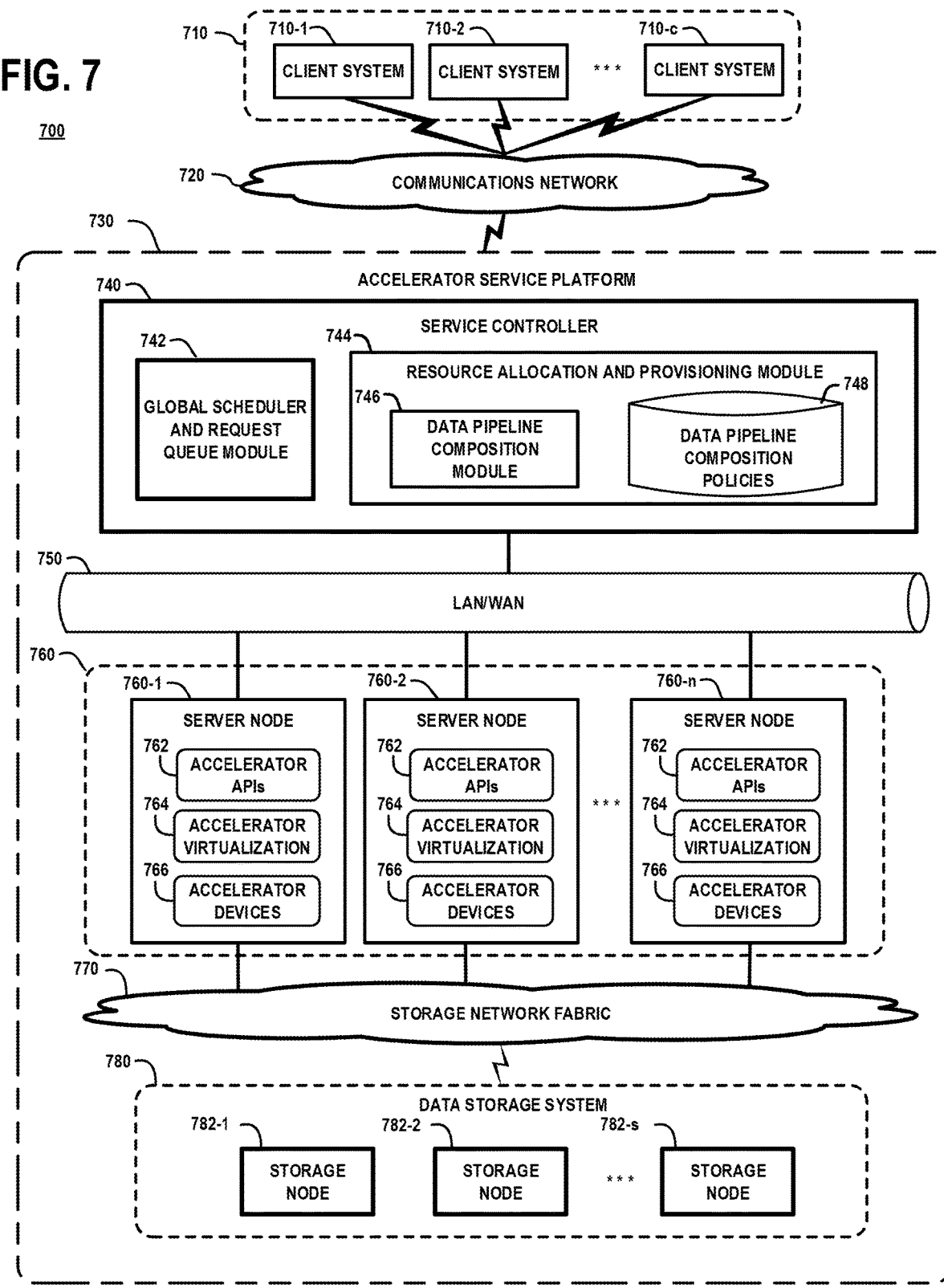
FIG. 7 schematically illustrates a cloud computing environment in which techniques according to embodiments of the invention are implemented for dynamically composing and implementing a data flow pipeline that is decoupled from the execution flow of a high-performance computing task.

It is to be appreciated that the exemplary systems and methods discussed herein for composing and implementing data flow pipelines that are decoupled from the execution flow of a high-performance computing task can be utilized in a cloud computing system which provide, e.g., XaaS, GPUaaS, etc., to provide HPC services to customers including, but not limited to, deep learning model training, big data analytics, and other HPC applications. For example, FIG. 7 schematically illustrates a cloud computing environment in which techniques according to embodiments of the invention are implemented for dynamically composing and implementing a data flow pipeline that is decoupled from the execution flow of a high-performance computing task. In particular, FIG. 7 schematically illustrates a computing system 700 which comprises a plurality of client systems 710-1, 710-2, . . . , 710-c (collectively referred to as client systems 710), a communications network 720, and an accelerator service platform 730. The accelerator service platform 730 provides cloud services such as GPUaaS, XaaS, etc., which can be accessed by the client systems 710 over the communications network 720. The accelerator service platform 730 comprises a service controller 740 (e.g., a control server node), a service platform network 750, a server cluster 760 (e.g., server farm) comprising a plurality of server nodes 760-1, 760-2, . . . , 760-n, a storage network fabric 770, and a data storage system 780 comprising a plurality of data storage nodes 782-1, 782-2, . . . , 782-s.

The service controller 740 comprises a global service request scheduler and request queue module 742, and a resource allocation and provisioning module 744, the functions of which will be explained in further detail below. The resource allocation and provisioning module 744 comprises, among other modules, a data pipeline composition module 746 and a database of data pipeline composition policies 748. The server nodes 760-1, 760-2, . . . , 760n each comprise accelerator application programming interfaces (APIs) 762, an accelerator virtualization layer 764, and hardware accelerator devices 766. The hardware accelerator devices 766 include one or more types of hardware accelerator devices including, but not limited to, GPUs, FPGAs, ASICs, TPUs, IPUs, and other types of hardware accelerator devices and systems that are configured to support high-performance computing services provided by the accelerator service platform 730. In this regard, in some embodiments, the server cluster 760 may comprise a homogenous cluster of server nodes which implement one type of accelerator resources (e.g., GPU devices). In other embodiments, the server cluster 760 comprises a heterogeneous cluster of server nodes which implement two or more different types of accelerator resources (GPU devices, TPUs, etc.). The server nodes 760-1, 760-2, . . . , 760n of the server cluster 760 may implement one of many types of commercially available server operating systems including, but not limited to, a Windows server, a Sun Solaris server, an HP server, a Linux server, etc.

The accelerator APIs 762 provide libraries, drivers, pre-written code, classes, procedures, scripts, configuration data, etc., which (i) can be called or otherwise utilized by the accelerator devices 764 during execution of workloads (e.g., deep learning model training tasks) by the server nodes 760, or which (ii) are utilized by control functions executing on host processor devices of the server nodes to access or communicate with the accelerator devices 766 through accelerator device drivers. The types of software libraries and accelerator APIs 762 that are implemented will vary depending on the types of accelerator devices used.

The accelerator virtualization layers 764 each comprise a virtualization engine and a hypervisor platform, which are configured to create virtual accelerator resources (e.g., virtual GPUs, virtual TPUs, etc.) which allow virtual machines executing on host servers 760 to access and share the physical accelerator devices 766 with other servers or computing systems. The accelerator device drivers of the accelerator APIs 762 provide virtual drivers that allow the virtual machines to access and control the virtual accelerator resources that are instantiated within the accelerator virtualization layer 764. The accelerator virtualization layer 764 allows the accelerator service platform 730 to provision virtual accelerator resources to execute different types of workloads (e.g., a data-parallel deep learning model training task) using a hybrid set of different types of accelerator resources (e.g., GPUs, TPUs, etc.) with different performances and architectures.

The client systems 710 comprise various types of computing devices such as desktop computers, laptop computers, servers, etc. In one embodiment, the client systems 710 comprise servers that reside in a remote data center or enterprise network which require accelerator processing services. In one embodiment, the client systems 710 comprise servers that reside within the server cluster 760 of the accelerator service platform 730. The communications network 720 is configured to enable network communication between the client systems 710 and the accelerator service platform 730. While the communications network 720 is generically depicted in FIG. 7, it is to be understood that the communications network 720 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 720 in some embodiments comprises combinations of multiple different types of communications networks each comprising network devices configured to communicate using Internet Protocol (IP) or other related communication protocols. The network 720 comprises intermediate points (such as routers, switches, etc.) and other elements that form a network backbone to establish communication paths and enable communication between network endpoints.

The service platform network 750 is configured to enable communication between the service controller 740 and the server nodes 760-1, 760-2, . . . , 760n of the server cluster 760, as well as to enable peer-to-peer network communication between the server nodes 760-1, 760-2, . . . , 760n within the server cluster 760. Depending on the network distribution and geographic location of the constituent components and nodes of the accelerator service platform 730, the service platform network 750 may comprise, for example, a LAN, a WAN, or a combination of one or more LANs and WANs, as well as other types of communication networks that are commonly used to implement cloud computing systems. The storage network fabric 770 can be implemented using any suitable networking system and protocol to enable shared access to the data storage system 780 by the server nodes 760-1, 760-2, . . . , 760n of the server cluster 760. In one embodiment, the service platform network 750 and the storage network fabric 770 can be integrated into a converged framework such as a converged Ethernet framework using known techniques.

The data storage system 780 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. In one embodiment, the data storage nodes 782-1, 782-2, . . . , 782-s comprise storage appliances with memory controllers, processors, cache memory, and non-volatile storage media to provide persistent storage resources for the server nodes 760-1, 760-2, . . . , 760n of the server cluster 760 (e.g., to store training data used for deep learning model training jobs). The data storage devices of the data storage nodes 782-1, 782-2, . . . , 782-s may include one or more different types of persistent storage devices, or data storage arrays, such as hard disk drives (HDDs) or solid-state drives (SSDs), or other types and combinations of non-volatile memory. In one embodiment, the data storage nodes 782-1, 782-2, . . . , 782-s are implemented using, for example, an enterprise-class storage platform comprising high-performance, scalable storage arrays, which can be implemented for hyper-scale computing systems. For example, the data storage system 780 can be implemented using commercially available storage array systems of Dell EMC including, but not limited to, NS S, XtremIO, UNITY, VMAX, VNX, ScaleIO, etc.

The accelerator service platform 730 can be a private or public cloud computing system which implements, e.g., XaaS, GPUaaS and/or other types of cloud-based services to provide computing services to end-users or customers for HPC applications such as deep learning applications, machine learning, big data analytics, or other types of HPC applications that are typically implemented using a cloud-based service system to deliver consumer or business applications and services to multiple end users, service providers, and/or organizations. The service controller 740 is configured to implement or otherwise control various functionalities of the accelerator service platform 730 to support management operations. The service controller 740 and related functions can be distributed across one or more server nodes of the accelerator service platform 730.

The service controller 740 receives service requests from the client systems 710 for executing HPC jobs on the server cluster 760, and the received service requests are stored in a request queue that is controlled by the global scheduler and request queue module 742. As noted above, a service request can include various user-specified conditions and demands for executing a given job (e.g., deep learning model training job) associated with the service request. The service request and associated provisioning specifications are stored in the request queue pending scheduling by the global scheduler and request queue module 742. The service controller 740 utilizes the resource allocation and provisioning module 744 to allocate and provision computing resources within the accelerator service platform 730 for jobs pending in the request queue of the global scheduler and request queue module 742.

In one embodiment of the invention, the global scheduler and request queue module 742 manages the scheduling and execution of pending service requests from multiple client systems using queue-based GPU virtualization and management systems and methods as disclosed in commonly assigned U.S. Pat. No. 10,109,030 entitled "Queue-Based GPU Virtualization and Management System," which is incorporated herein by reference. A queue-based GPU virtualization and management system allows the client systems 710 to share the accelerator resources (e.g., GPU devices) of a given server node temporally and/or spatially. For example, in one embodiment, the utilization of a GPU device is shared temporally, wherein a given GPU device can be allocated to two or more client systems, and wherein the tasks of the two or more client systems are executed on the same allocated GPU device at different times. In another embodiment, a given GPU device can be allocated to two or more client systems such that utilization of the given GPU device is shared spatially, wherein the different tasks of the two or more client systems are concurrently executed on the given GPU device using different regions (threads, cores) of the given GPU device.

For a multi-sever node allocation wherein multiple accelerator devices 766 across multiple server nodes in the server cluster 760 are allocated to handle a service request for a given client system, the global scheduler and request queue module 742, together with the resource allocation and provisioning module 744, communicate with the server nodes 760 to provision accelerator resources (e.g., GPU devices), allocate master and slave server nodes, and command the allocated server nodes to logically bind together and establish communication links to conduct peer-to-peer operations for executing the HPC processing tasks associated with the client request. Such techniques are disclosed in commonly assigned U.S. patent application Ser. No. 15/487,887, filed on Apr. 14, 2017, entitled *"Managing Access to a Resource Pool of Graphics Processing Units Under Fine Grain Control,"* the disclosure of which is incorporated herein by reference. With such techniques, a given client system will see a larger logical server node, while a master server node coordinates and manages execution of the accelerator processing tasks across all of the allocated server nodes with fine grain control, transparently to the client system.

The resource allocation and provisioning module 744 can implement suitable methods or protocols for selecting, allocating, scheduling and provisioning one or more server nodes and associated accelerator resources (e.g., GPU devices) for executing HPC workloads associated with client service requests, depending on various factors including, but not limited to, the availability of accelerator devices 766 and processing resources of the server nodes 730, the nature of the HPC processing tasks associated with the service request, user-specified conditions and resource demands for executing a given job, conditions based on a service level agreement (SLA) with the given client, predefined policies of the service provider for handing specific types of jobs, etc.

For example, the resource allocation and provisioning module 744 can implement topology determination methods to periodically query the server nodes 760, the networks 750 and 770, and the data storage system 780, etc., within the accelerator service platform 730 to automatically discover/identify constituent objects (logical objects and physical objects) of the accelerator service platform 730 (e.g., servers, routers, firewalls, applications, databases, network resources, storage resources, etc.). In a typical computing environment, the sever cluster 760 will be a heterogeneous computing cluster wherein the constituent server nodes 760-1, 760-2, . . . , 760*n* are implemented using a wide range of different topologies. The term "topology" as used herein broadly refers to the hardware configuration and intrande connections of hardware elements of the server nodes 760 and storage nodes 782, the network interface elements to support inter-node connections between server nodes within the cluster 760, the hardware and network configurations of the data storage system 780, etc.

The topology information collected for a given server node will indicate the types and number of hardware processor resources (e.g., CPUs, GPUs, other accelerator devices) of the given server node. In addition, the topology information will indicate the types of intra-node connection topologies (communication links) used to connect the hardware processor resources of a given server node. For example, the intra-node connection topologies of a given server node can be implemented using various communication protocols such as a Remote Direct Memory Access (RDMA) protocols, an InfiniBand (TB) protocol, a Peripheral Component Interconnect Express (PCIe) protocol, a NVIDTA® NVLink™ protocol, NVIDIA GPUDirect, and other point-to-point serial interconnect protocols that enable, e.g., CPU-GPU and GPU-GPU communication. Furthermore, a given server node may implement the QuickPath Interconnect (QPI) protocol, which is a point-to-point processor interconnect framework that enables a Non-Uniform Memory Access (NUMA) architecture for a cluster of processors, etc. The intra-node connection topology would include information regarding the types and arrangements of hardware connection elements including, but not limited to, switches (e.g., PCIe switches), Host Bridge, platform controller hub (PCH), etc.

In addition, the topology information collected includes information regarding the types of network interface devices and topologies that are implemented by the server nodes for inter-node communication within the cluster 760. For example, inter-node topology information for a given server node can include port numbers of the servers, the type of network interface circuitry (and number of interface cards) that a given server utilizes to connect to other servers (and network components) including, but not limited to, network interface controllers (NICs) (e.g. SmartNICs, RDMA-enabled NICs), Host Bus Adapter (HBA) cards, Host Channel Adapter (HCA) cards, and the types of inter-node communication protocols that are used by the server nodes for network communication including, but not limited to, protocols such as TCP/IP, Gigabit Ethernet (GbE) (e.g., 10/25/40/100GbE), RDMA, IB, Message Passing Interface (MPI), etc.

In one embodiment, the server nodes 760, the networks 750 and 770, and the data storage system 780 comprise reporting agents that are configured to determine the hardware configuration and hardware interconnect topology for the nodes and networks by analyzing a layer of low-level system drivers, and to report the topology information to the resource allocation and provisioning module 744. The reporting agents comprise software or firmware that run on the server nodes 760-1, 760-2, . . . , 760*n* to collect relevant server hardware information and usage and report such information to the resource allocation and provisioning module 744 which maintains such information in a central topology database. In addition, reporting agents may run on switch devices that are configured within the backbone networking infrastructure of the service platform network 750 and storage network fabric 770, as well as run on various elements of the data storage system 780.

The hardware information and interconnect topology detection process can be implemented by composing and analyzing device/system cmd-query results, typically via low-level HW drivers, libraries or APIs. For example, NVIDIA GPU has CUDA API and utilities such as the System Management Interface (nvidia-smi) (which is a command line utility) which can detect accelerator devices on a given server node, along with corresponding interconnect paths between the accelerator devices, processors, and other hardware components of the given server node. Moreover, for CPUs, command utilities such as lscpu, numactl, etc., can be used to determine information regarding the CPU architecture (number of CPUs, threads, cores, sockets, NUMA nodes, CPU caches vendor, family, model, etc.) present on the given GPU server node. Moreover, utilities such as lspci, Mellanox OpenFabrics Enterprise Distribution (OFED), and vendor specific command (cmds) can be used to determine information regarding network adapters (NICs, HBAs, etc.) that are implemented in a given server node.

The resource allocation and provisioning module 744 implements methods to generate a topology graph of the managed environment of the accelerator service platform 730 based on the topology information which is collected by the resource allocation and provisioning module 744. For example, in one embodiment, the resource allocation and provisioning module 744 implements a vertex-centric graph modeling program which is configured to generate a semantic model of the given topology in the form of a topology node graph with vertices and directed edges, wherein the vertices within the topology node graph correspond to classes of objects (virtual or physical) that are detected within the given topology. In one embodiment, the topology node graph is configured to implement and "event model" and associated "propagation model," which defines the objects within the given topology, the events which can be generated by the objects, the relationship between objects, and the events that may propagate along relationships to and from related objects.

The resource allocation and provisioning module 744 utilizes the topology node graph in conjunction with the real-time resource usage information of the resources within the computing accelerator service platform 730 to allocate and provision a set of resources for a given workload to be launched or for reallocating a set of resources for a currently running workload within the accelerator service platform 730. The resource allocation and provisioning module 744 can implement a workload monitor module to monitor the performance of running workloads and to detect bottlenecks by collecting and utilizing telemetry information which provides real-time resource usage information (e.g., on a per application/workload basis) of the running workloads. The telemetry information collected for a given running workload comprises, for example, bus or networking bandwidth usage information (i.e., percent of usage), current bandwidth usage of the communication links between provisioned processor devices (e.g., CPUs, accelerator devices, etc.), CPU and accelerator device utilization, data storage throughput, and other types of resource usage information which can be utilized to monitor for communication overload or bottlenecks that could result in degraded performance of a running workload.

In the exemplary embodiment of FIG. 7, the resource allocation and provisioning module 744 implements the data pipeline composition module 746 and associated data pipeline composition policies 748 to provision a plurality of logical nodes within physical nodes within the server cluster 760 and/or the data storage system 780 to dynamically compose a data flow pipeline which is configured to perform data flow operations associated with a HPC computing job, using techniques as discussed herein. As noted above, depending on the type HPC computing job to execute, the logical nodes include one more instances of logical nodes to perform data storage input/output operations, data pre-processing operations, and data staging operations, which are decoupled from the execution flow of the computing job. The logical nodes can be instantiated on the server nodes 760 and/or the data storage node 782.

Figure 8:
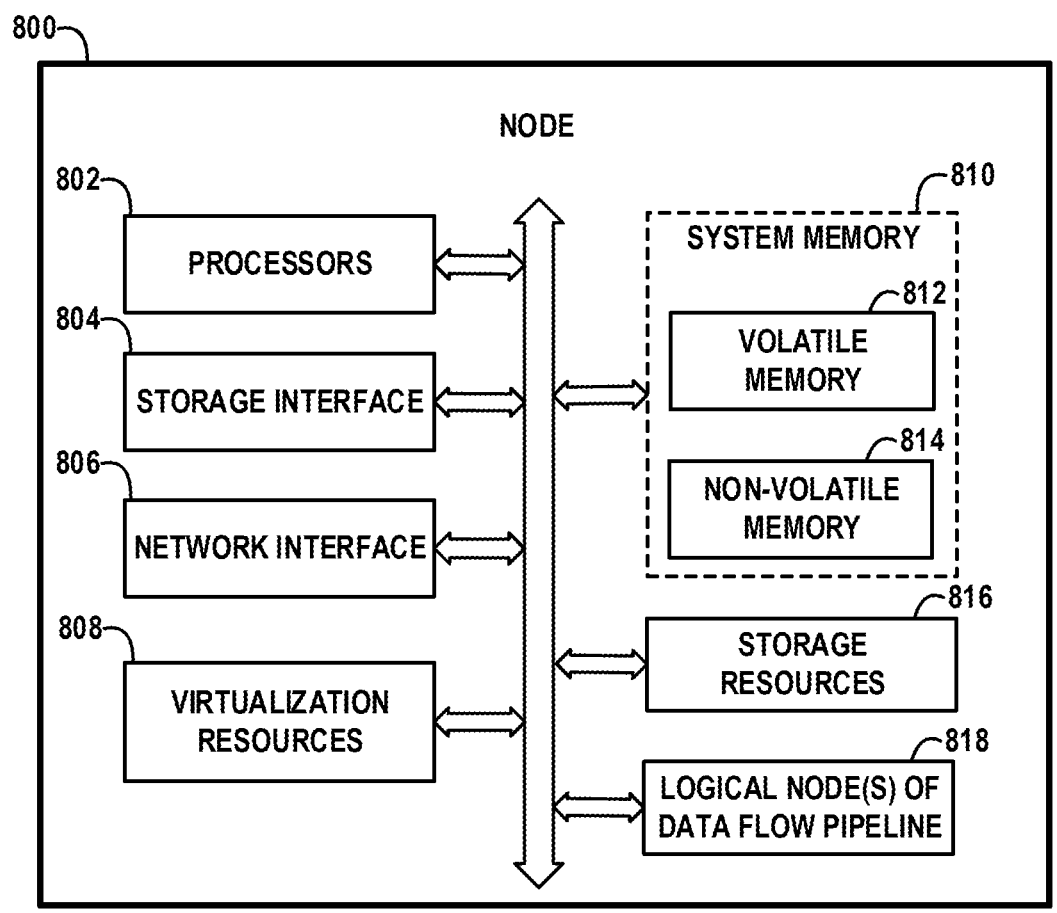
FIG. 8 schematically illustrates an embodiment of a server node or storage node in the system of FIG. 7 which can be configured to host one or more logical nodes of a dynamically composed data flow pipeline, according to an embodiment of the invention.

FIG. 8 schematically illustrates an embodiment of a computing node 800 (e.g., server node or storage node) in the system of FIG. 7 which can be configured to host one or more logical nodes of a dynamically composed data flow pipeline, according to an embodiment of the invention. The computing node 800 comprises processors 802, storage interface circuitry 804, network interface circuitry 806, virtualization resources 808, system memory 810, storage resources 816, and one or more logical nodes 818 that form part or all of a dynamically composed data flow pipeline. The system memory 810 comprises volatile memory 812 and non-volatile memory 814.

The processors 802 comprise one or more types of hardware processors that are configured to process program instructions and data to execute a native operating system (OS) and applications that run on the computing node 800. For example, the processors 802 may comprise one or more CPUs, microprocessors, microcontrollers, ASICs, FPGAs, and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), ASICs, FPGAs, TPUs, IPUs, DLAs, AI accelerators, and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, NVMe, PCIe, Parallel ATA (PATA), Serial ATA (SATA), Serial Attached SCSI (SAS), Fibre Channel, etc. The network interface circuitry 806 enables the computing node 800 to interface and communicate with a network and other system components. The network interface circuitry 806 comprises network controllers such as network cards and resources (e.g., NICs (e.g. SmartNICs, RDMA-enabled NICs), HBA cards, HCA cards, I/O adaptors, converged Ethernet adaptors, etc.) to support communication protocols and interfaces including, but not limited to, PCIe, DMA and RDMA data transfer protocols, etc.

The virtualization resources 808 can be instantiated to execute one or more applications or functions which are hosted by the computing node 800. For example, the virtualization resources 808 can be configured to implement the various modules and functionalities of the logical nodes 818 of the data flow pipeline. In one embodiment, the virtualization resources 808 comprise virtual machines that are implemented using a hypervisor platform which executes on the computing node 800, wherein one or more virtual machines can be instantiated to execute functions of the computing node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the computing node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the computing node 800 and the logical nodes 818 of the data flow pipeline. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the logical nodes 818 comprise program code that is loaded into the system memory 810 (e.g., volatile memory 812), and executed by the processors 802 to perform respective functions as described herein. In this regard, the system memory 810 resources, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The term "memory" or "system memory" as used herein refers to volatile and/or nonvolatile memory which is utilized to store application program instructions that are read and processed by the processors 802 to execute a native operating system and one or more applications or processes hosted by the computing node 800, and to temporarily store data that is utilized and/or generated by the native OS and application programs and processes running on the computing node 800. The storage resources 816 can include one or more hard disk drives (HDD), solid state drive (SSD) storage devices, etc. The storage resources 816 can store raw training data which is utilized for performing deep learning model training tasks as discussed herein.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   receiving a client request from a client node to provision resources for executing a computing job in a distributed computing system;
   provisioning a plurality of accelerator resources of one or more server nodes in the distributed computing system to perform tasks associated with an execution flow of the computing job; and
   provisioning a plurality of logical nodes within the distributed computing system to compose a data flow pipeline which is configured to perform data flow operations associated with the computing job for providing data to the provisioned accelerator resources to perform the tasks associated with the execution flow of the computing job;
   wherein the data flow operations of the computing job comprise data storage input/output operations, data pre-processing operations, and data staging operations, which are decoupled from the execution flow of the computing job.

2. The method of claim 1, wherein the computing job comprises a distributed deep learning model training job, wherein the execution flow comprises application programming interface (API) calls that are directed to the one or more server nodes from the client node to perform deep learning model training tasks using data provided by the data flow pipeline.

3. The method of claim 1, wherein the logical nodes of the data flow pipeline comprise:
   at least one data storage node to store raw data associated with the computing job;
   at least one data pre-processing node comprising processors which execute data pre-processing functions on raw data accessed from the at least one data storage node to generate pre-processed data; and
   at least one data staging node comprising staging memory to store the pre-processed data generated by the at least one data pre-processing node.

4. The method of claim 3, further comprising performing a memory copy operation by the one or more server nodes to copy the pre-processed data from the staging memory of the at least one data staging node to a memory of one or more accelerator devices, in response to a memory copy API request issued by the client node.

5. The method of claim 3, further comprising the at least one data pre-processing node continually pre-loading and pre-processing raw data accessed from the at least one data storage node independently of the execution flow between the client node and the one or more server nodes.

6. The method of claim 3, wherein the at least one data storage node, the at least one data pre-processing node, and the at least one data staging node reside on different server nodes of the distributed computing system.

7. The method of claim 3, wherein the at least one data pre-processing node and the at least one data staging node reside on a same server node of the distributed computing system.

8. The method of claim 3, wherein the at least one data storage node and the at least one data pre-processing node reside on a same storage node of a data storage system within the distributed computing system.

9. The method of claim 3, wherein the at least one data staging node resides on at least one of the one or more server nodes of the distributed computing system.

10. The method of claim 1, wherein the plurality of logical nodes within the distributed computing system are provisioned to compose the data flow pipeline based on one or more predefined data pipeline composition policies which specify at least one of (i) a number of instances of the logical nodes to be provisioned and (ii) which logical nodes should be co-located on a same physical node.

11. The method of claim 1, further comprising initiating a remote process mode on the client node to bypass local data loading and pre-processing operations by processors on the client node.

12. The method of claim 11, wherein responsive to the remote process mode, the client node:
 intercepting an API call issued during execution of an application associated with the computing job on a processor of the client node; and
 sending a coordination message to the one or more server nodes to enable the one or more server nodes to execute a task associated with the intercepted API call based on information contained in the coordination message.

13. The method of claim 1, wherein the distributed computing system comprises one of an accelerator-as-a-service system and a graphics processing unit (GPU)-as-a-service system.

14. An article of manufacture comprising a non-transitory processor-readable storage medium having stored program code of one or more software programs, wherein the program code is executable by one or more processors to implement method steps comprising:
 receiving a client request from a client node to provision resources for executing a computing job in a distributed computing system;
 provisioning a plurality of accelerator resources of one or more server nodes in the distributed computing system to perform tasks associated with an execution flow of the computing job; and
 provisioning a plurality of logical nodes within the distributed computing system to compose a data flow pipeline which is configured to perform data flow operations associated with the computing job for providing data to the provisioned accelerator resources to perform the tasks associated with the execution flow of the computing job;
 wherein the data flow operations of the computing job comprise data storage input/output operations, data pre-processing operations, and data staging operations, which are decoupled from the execution flow of the computing job.

15. The article of manufacture of claim 14, wherein the computing job comprises a distributed deep learning model training job, wherein the execution flow comprises application programming interface (API) calls that are directed to the one or more server nodes from the client node to perform deep learning model training tasks using data provided by the data flow pipeline.

16. The article of manufacture of claim 14, wherein the logical nodes of the data flow pipeline comprise:
 at least one data storage node to store raw data associated with the computing job;
 at least one data pre-processing node comprising processors which execute data pre-processing functions on raw data accessed from the at least one data storage node to generate pre-processed data; and
 at least one data staging node comprising staging memory to store the pre-processed data generated by the at least one data pre-processing node.

17. The article of manufacture of claim 14, wherein the plurality of logical nodes within the distributed computing system are provisioned to compose the data flow pipeline based on one or more predefined data pipeline composition policies which specify at least one of (i) a number of instances of the logical nodes to be provisioned and (ii) which logical nodes should be co-located on a same physical node.

18. A distributed computing system, comprising:
 a server cluster comprising a plurality of server nodes, wherein the plurality of server nodes comprise accelerator resources;
 a control server node comprising a memory to store program instructions, and a processor to execute the stored program instructions to cause the control server node to perform a process which comprises:
 receiving a client request from a client node to provision resources for executing a computing job in the distributed computing system;
 provisioning a plurality of accelerator resources of one or more server nodes of the plurality of server nodes in the distributed computing system to perform tasks associated with an execution flow of the computing job; and
 provisioning a plurality of logical nodes within the distributed computing system to compose a data flow pipeline which is configured to perform data flow operations associated with the computing job for providing data to the provisioned accelerator resources to perform the tasks associated with the execution flow of the computing job;
 wherein the data flow operations of the computing job comprise data storage input/output operations, data pre-processing operations, and data staging operations, which are decoupled from the execution flow of the computing job.

19. The distributed computing system of claim 18, wherein the computing job comprises a distributed deep learning model training job, wherein the execution flow comprises application programming interface (API) calls that are directed to the one or more server nodes of the plurality of server nodes from the client node to perform deep learning model training tasks using data provided by the data flow pipeline.

20. The distributed computing system of claim 18, wherein the logical nodes of the data flow pipeline comprise:
- at least one data storage node to store raw data associated with the computing job;
- at least one data pre-processing node comprising processors which execute data pre-processing functions on raw data accessed from the at least one data storage node to generate pre-processed data; and
- at least one data staging node comprising staging memory to store the pre-processed data generated by the at least one data pre-processing node;
- wherein the plurality of logical nodes within the distributed computing system are provisioned to compose the data flow pipeline based on one or more predefined data pipeline composition policies which specify at least one of (i) a number of instances of the logical nodes to be provisioned and (ii) which logical nodes should be co-located on a same physical node.

* * * * *